(12) United States Patent
Ro et al.

(10) Patent No.: US 9,867,230 B2
(45) Date of Patent: *Jan. 9, 2018

(54) METHOD AND DEVICE FOR DETECTING AND GENERATING SYNCHRONIZATION SIGNAL FOR DEVICE-TO-DEVICE WIRELESS COMMUNICATION

(71) Applicant: Samsung Electronics Co., Ltd., Suwon-si (KR)

(72) Inventors: Sangmin Ro, Seoul (KR); Yongjun Kwak, Yongin-si (KR); Jinyoung Oh, Seoul (KR); Seunghoon Choi, Suwon-si (KR)

(73) Assignee: SAMSUNG ELECTRONICS CO., LTD., Suwon-si, Gyeonggoi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/470,755

(22) Filed: Mar. 27, 2017

(65) Prior Publication Data

US 2017/0202057 A1 Jul. 13, 2017

Related U.S. Application Data

(63) Continuation of application No. 14/607,830, filed on Jan. 28, 2015, now Pat. No. 9,609,503.

(30) Foreign Application Priority Data

Jan. 28, 2014 (KR) .................. 10-2014-0010765
May 16, 2014 (KR) .................. 10-2014-0058917

(51) Int. Cl.
*H04W 4/00* (2009.01)
*H04W 84/18* (2009.01)
(Continued)

(52) U.S. Cl.
CPC .......... *H04W 84/18* (2013.01); *H04B 7/2696* (2013.01); *H04L 27/2657* (2013.01);
(Continued)

(58) Field of Classification Search
None
See application file for complete search history.

(56) References Cited

U.S. PATENT DOCUMENTS 9,609,503 B2 * 3/2017 Ro .................. H04W 8/005
2011/0013720 A1 1/2011 Lee et al.
2014/0064203 A1 3/2014 Seo et al.

FOREIGN PATENT DOCUMENTS

WO  WO 2012/128505 A2  9/2012

OTHER PUBLICATIONS

International Search Report dated Apr. 24, 2015 in connection with International Patent Application No. PCT/KR2015/000915, 3 pages.
(Continued)

*Primary Examiner* — Erika Washington

(57) ABSTRACT

Provided is a method of generating a Device-to-Device Synchronization Signal (D2DSS) by a terminal according to an embodiment of the present disclosure. The method includes determining a service attribute for identifying whether the terminal is serviced by at least one base station; and generating a D2DSS for identifying whether the terminal is serviced by the base station, based on the determination result. In addition, provided is a method of configuring D2D synchronization by a terminal according to an embodiment of the present disclosure. The method includes receiving a signal from at least one base station or another device; determining whether a synchronization signal is detected from the received signal; and when the synchronization
(Continued)

signal is detected, configuring synchronization with the another device based on the timing reference of the detected synchronization signal.

10 Claims, 10 Drawing Sheets

(51) Int. Cl.
| | | |
|---|---|---|
| *H04B 7/26* | (2006.01) | |
| *H04L 29/08* | (2006.01) | |
| *H04W 56/00* | (2009.01) | |
| *H04L 27/26* | (2006.01) | |
| *H04W 92/18* | (2009.01) | |
| *H04W 88/06* | (2009.01) | |
| *H04L 27/00* | (2006.01) | |

(52) U.S. Cl.
CPC ....... *H04L 29/08306* (2013.01); *H04W 4/005* (2013.01); *H04W 56/002* (2013.01); *H04W 56/0025* (2013.01); *H04W 88/06* (2013.01); *H04W 92/18* (2013.01); *H04L 2027/0097* (2013.01)

(56) References Cited

OTHER PUBLICATIONS

3GPP TSG RAN WG1 Meeting #75; "Discussion on design of D2DSS and PD2DSCH"; R1-135479; San Francisco, CA; Nov. 11-15, 2013; 5 pages.

3GPP TSG RAN WG1 Meeting #75; "Synchronization Signals and Channel Design for D2D Discovery and Communication"; R1-135903; San Francisco, CA; Nov. 11-15, 2013; 10 pages.

3GPP TSG RAN WG1 Meeting #75; "Design considerations for D2DSS"; R1-135532; San Francisco, CA; Nov. 11-15, 2013; 5 pages.

3GPP TSG RAN WG1 Meeting #75; "Discussion on Synchronization for D2D Communications"; R1-135488; San Francisco, CA; Nov. 11-15, 2013; 7 pages.

Nokia et al.; "D2D Synchronization and Transmission Timing"; 3GPP TSG-RAN WG1 Meeting #75; R1-135591; San Francisco, USA; Nov. 11-15, 2013; 5 pages.

Alcatel-Lucent et al.; "Device Discovery for D2D Proximity Services"; 3GPP TSG-RAN1 Meeting #72bis; R1-130954; Chicago, USA; Apr. 15-19, 2013; 4 pages.

Nokia et al.; "UE Based D20 Synchronization Scheme"; 3GPP TSG-RAN WG1 Meeting #74bis; R1-134536; Guangzhou, China; Oct. 7-11, 2013; 4 pages.

Ericsson; "Synchronization Procedures for D2D Discovery and Communication"; 3GPP TSG RAN WG1 Meeting #75;4R1-135803; San Francisco, USA; Nov. 11-15, 2013; 6 pages.

"3rd Generation Partnership Project; Technical Specification Group RAN; Study on LTE Device to Device Proximity Services-Radio Aspects; (Release 12)"; 3GPP TR 36.843 V1.0.0; Nov. 2013; 32 pages.

Foreign Communication from Related Counterpart Application; European Patent Application 15742658.6; Extended European Search Report and European Search Opinion dated Aug. 16, 2017; 11 pages.

* cited by examiner

METHOD AND DEVICE FOR DETECTING AND GENERATING SYNCHRONIZATION SIGNAL FOR DEVICE-TO-DEVICE WIRELESS COMMUNICATION

CROSS-REFERENCE TO RELATED APPLICATION(S)

The present application is a continuation of U.S. patent application Ser. No. 14/607,830 filed on Jan. 28, 2015, which is now U.S. Pat. No. 9,609,503, which claims the benefit under 35 U.S.C. §119(a) of Korean patent applications filed in the Korean Intellectual Property Office on May 16, 2014 and Jan. 28, 2014 and assigned Serial Nos. 10-2014-0058917 and 10-2014-0010765, the entire disclosures of which are hereby incorporated by reference into the present disclosure as if fully set forth herein.

TECHNICAL FIELD

The present application relates to a method and device for measuring and generating a synchronization signal for device-to-device wireless communication. More particularly, the present application relates to a synchronization signal design in a wireless communication system, and the objective of the present application is to provide a method and device which can design a synchronization signal for acquiring synchronization in communication between device-to-device support terminals and can acquire synchronization of a terminal using the same.

BACKGROUND

The 3rd Generation Partnership Project (3GPP), the standards group for asynchronous cellular mobile communication, is studying the support for wireless communication between terminals or devices, namely, Device-to-Device (D2D) communication using the Long Term Evolution (LTE) system standards, as well as conventional wireless communication between a base station and a terminal. In particular, one important function which 3GPP requires of D2D communication is a public safety service support function. That is, even in the case of emergency (such as in a natural disaster) in which a normal network service cannot be provided, the D2D communication has to be able to support LTE based wireless communication within or between police, firemen, and government agents.

In general, for smooth communication service support in a wireless communication system, it is necessary to acquire a tinning reference to be used for signal transmission or reception of terminals in a system, namely, to acquire time synchronization. Also, in an LTE system, when a cellular network service is operating normally, terminals inside the service region of a base station can receive a Primary Synchronization Signal (PSS)/Secondary Synchronization Signal (SSS) transmitted through a downlink from the base station to acquire synchronization. However, in situations in which the cellular network service cannot be normally provided due to an emergency as described above, it is impossible to acquire synchronization from the base station.

Accordingly, there is a need for a synchronization acquisition means for supporting communication between devices even in situations in which cellular network service cannot be normally provided due to emergencies.

SUMMARY

To address the above-discussed deficiencies, it is a primary object to provide a method and device for measuring and generating a synchronization signal for device-to-device wireless communication.

The present disclosure provides a D2DSS signal design plan capable of distinguishing the type of a D2DSS transmission subject such that a terminal to transmit a D2DSS in the D2D communication environment described above in the background can efficiently select a timing reference to use when detecting a plurality of D2DSSs having different timing references.

In addition, another aspect of the present disclosure is to provide a method and device for acquiring a timing reference when transmitting a D2DSS using the designed D2DSS.

The technical subjects pursued in the present disclosure may not be limited to the above mentioned technical subjects, and other technical subjects which are not mentioned may be clearly understood, through the following descriptions, by those skilled in the art of the present disclosure.

In accordance with one aspect of the present disclosure, a method of generating a Device-to-Device Synchronization Signal (D2DSS) by a terminal is provided. The method includes determining a service attribute for identifying whether the terminal is serviced by at least one base station; and generating a D2DSS for identifying whether the terminal is serviced by the base station, based on the determination result.

In accordance with another aspect of the present disclosure, a device of a terminal for generating a Device-to-Device Synchronization Signal (D2DSS) is provided. The device includes a transmission or reception unit that communicates with at least one base station or device; and a controller that determines a service attribute for identifying whether the terminal is serviced by at least one base station and makes a control to generate a D2DSS for identifying whether the terminal is serviced by the base station, based on the determination result.

In accordance with another aspect of the present disclosure, a method of configuring D2D synchronization by a terminal is provided. The method includes: receiving a signal from at least one base station or another device; determining whether a synchronization signal is detected from the received signal; and when the synchronization signal is detected, configuring synchronization with the another device based on the timing reference of the detected synchronization signal.

In accordance with another aspect of the present disclosure, a terminal for Device-to-Device (D2D) synchronization configuration is provided. The terminal includes a communication unit that transmits or receives a signal to or from at least one base station or another device; and a controller that receives a signal from the at least one base station or the another device; determines whether a synchronization signal is detected from the received signal, and when the synchronization signal is detected, makes a control to configure synchronization with the another device based on the timing reference of the detected synchronization signal.

As described above, the present disclosure provides a method and device for measuring and generating a synchronization signal for device-to-device wireless communication.

Through the D2DSS design method according to the embodiment of the present disclosure, a terminal to transmit a D2DSS can distinguish the types of D2DSS transmission subjects when detecting a plurality of D2DSSs. Based on this, the terminal can effectively select the timing reference of the D2DSS transmission subject to which the D2DSS transmission timing reference thereof is fit.

Furthermore, in cases where the D2DSS design method according to the present disclosure is applied, D2DSS design is easy when D2D communication is introduced into an LTE system.

Effects obtainable from the present disclosure may not be limited to the above mentioned effects, and other effects which are not mentioned may be clearly understood, through the following descriptions, by those skilled in the art of the present disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
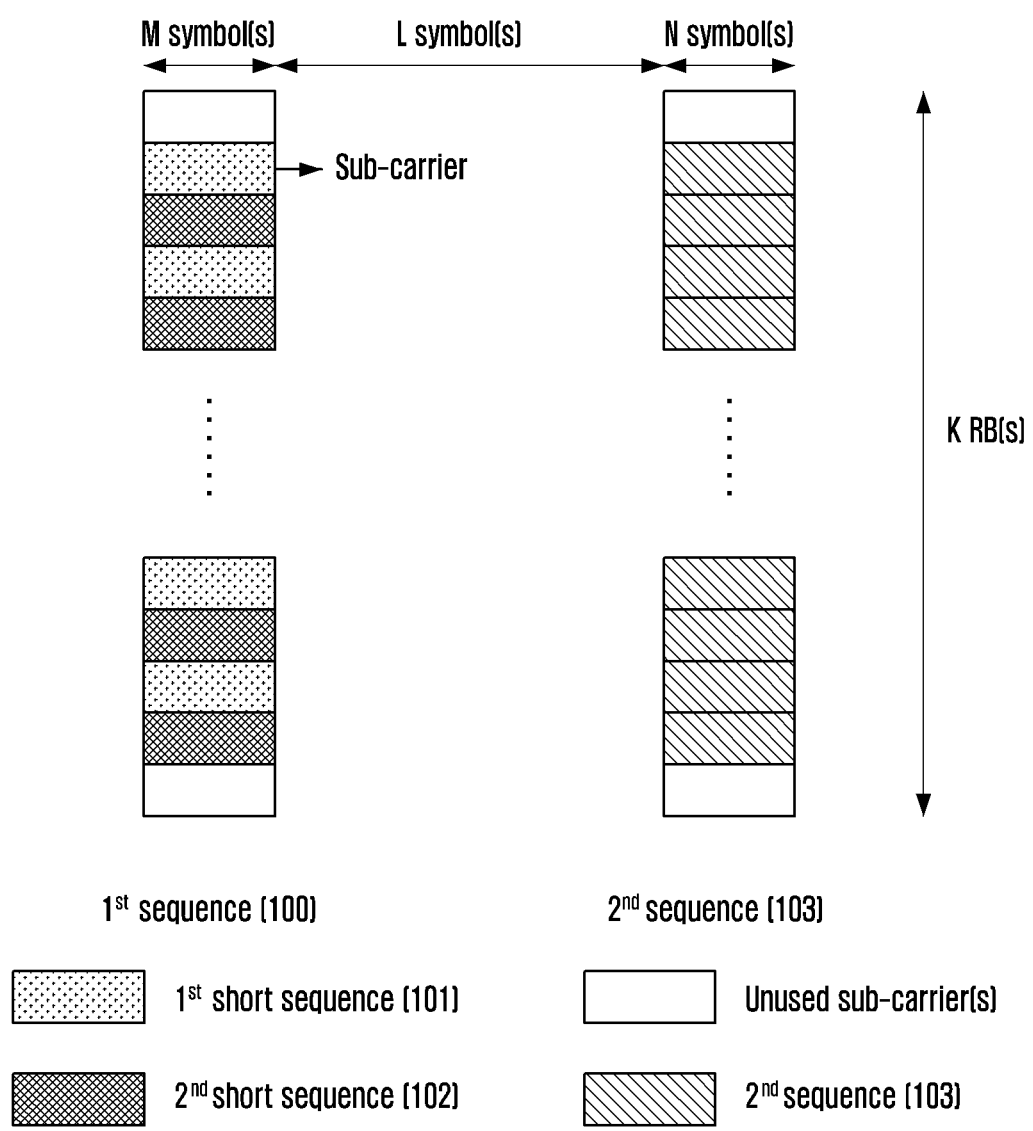
FIG. 1 illustrates an example of D2DSS signal design according to embodiments of the present disclosure.

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communications system. Hereinafter, various embodiments of the present disclosure will be described in detail with reference to the accompanying drawings. It should be noted that the same elements will be designated by the same reference numerals although they are shown in different drawings. Further, a detailed description of a known function and configuration which may make the subject matter of the present disclosure unclear will be omitted. Hereinafter, it should be noted that only the descriptions will be provided that may help understanding the operations provided in association with the various embodiments of the present disclosure, and other descriptions will be omitted to avoid making the subject matter of the present disclosure rather unclear.

Although the following detailed description of embodiments of the present disclosure is directed to the 3GPP LTE standard, it can be understood by those skilled in the art that the present disclosure can also be applied to any other communication system having similar technical backgrounds and channel formats, with slight modifications, without substantially departing from the scope of the present disclosure.

Hereinafter, a method of designing a discovery signal and a method and device for allocating a discovery signal resource and detecting a discovery signal, according to exemplary embodiments of the present disclosure, is described in detail.

In addition, a physical layer signal structure of an LTE system is considered for convenience of description. A radio frame having a unit of 10 ms is present in the physical layer signal structure of the LTE system. The radio frame consists of ten subframes having units of 1 ms and one subframe consists of fourteen symbols.

In the 3GPP standards, a separate synchronization signal for D2D communication is introduced as a means for acquiring synchronization between D2D terminals to satisfy public safety service support requirements. A terminal transmits a D2DSS through resources configured for uplink D2D communication. Other surrounding terminals receive the D2DSS from the terminal and acquire synchronization. Here, the D2D terminals retain a function of receiving an uplink signal.

Before transmitting the D2DSS, the terminal attempts to detect PSS/SSS transmitted from a base station or a D2DSS transmitted from another terminal. If both types of synchronization signals are not detected, the terminal attempting the detection recognizes that there is no subject around for providing a timing reference, and can provide a timing reference for D2D communication by transmitting the D2DSS according to the timing reference thereof. If the terminal attempting the detection succeeds in detecting the PSS/SSS from the base station or the D2DSS from another terminal, the terminal, before transmitting the D2DSS, can synchronize a receiver thereof according to the timing reference of the subject having transmitted the detected synchronization signal.

While performing the above-described operation, the terminal detects a plurality of synchronization signals having different timing references before transmitting the D2DSS. In this case, a rule is required to determine the timing reference of the synchronization signal for the transmission of the D2DSS. One of the methods under discussion in the LTE standards is to determine the priority of the timing reference to which the terminal preferentially conforms when transmitting the D2DSS, depending upon the type of subject having transmitted a synchronization signal.

For example, when a D2DSS transmission terminal detects two synchronization signals, one being a PSS/SSS which a base station has transmitted through a downlink and the other being a D2DSS which another terminal has transmitted through an uplink, the terminal transmitting the D2DSS can determine to use the timing reference for the PSS/SSS of the base station. In another example, when a D2DSS transmission terminal detects two synchronization signals, one being a D2DSS which a terminal inside a normal network operation region has transmitted and the other being a D2DSS which a terminal outside the normal network operation region has transmitted, the terminal transmitting the D2DSS can determine to transmit the D2DSS using the timing reference for the D2DSS which the terminal inside the normal network operation region has transmitted.

In case of emergency, one-to-many communications, namely, broadcast communication for a particular group performing public safety work, for example a group of police or firemen or the entire group, is more efficient than one-to-one communication between mobiles stations. In the current Release-12 (Rel-12) step, the 3GPP has also agreed to use broadcast communication as a D2D communication scheme. In addition, physical layer feedback of a closed loop method, such as hybrid automatic repeat request (HARQ) acknowledge character (ACK) or negative-acknowledge character (HACK), is not likely to be applied in view of characteristics of one-to-many communication.

Wireless resources used by a transmission terminal in D2D communication can be allocated by one of the two following methods. First, in the central resource allocation method, the transmission terminal can be allocated with wireless resources to use, by a particular resource allocation subject. The particular resource allocation subject can serve as a base station of the cellular communication, and when a network cannot normally provide a service, a particular terminal can perform the resource allocation function. In this case, it is possible to perform D2D communication without collision of wireless resources by scheduling the wireless resources of each terminal inside the region of the resource allocation terminal.

However, in cases using the central allocation method, selecting the particular resource allocation terminal is separately determined, and since a terminal performing resource allocation has to support the function of the base station, a burden due to the complexity of the terminal increases. In addition, it is necessary to define a control channel for transmitting or receiving the resource allocation information. Furthermore, in cases where a plurality of terminals performing resource allocation are adjacent to each other, mediation information between the resource allocation terminals is required to prevent resource allocation collision of the terminals in the adjacent regions. Although the base station can transfer the mediation information using a wired network, a separate physical channel or signal has to be defined for exchange of the mediation information between the resource allocation terminals.

Second, in the distributed resource allocation method, a transmission terminal can select a wireless resource to use. The process in which the transmission terminal selects the wireless resource can be generally performed through the Channel Sense Multiple Access (CSMA) or Collision Avoidance (CA) method. That is, the transmission terminal performs channel sensing for a wireless resource region configured for D2D communication to identify whether the current corresponding wireless resource is used for D2D communication of another terminal. If it is determined that the corresponding wireless resource is occupied by another terminal, the transmission terminal continues to perform the channel sensing to discover an available wireless resource without using the corresponding wireless resource. If it is determined that the corresponding wireless resource is empty, the transmission terminal can transmit a signal thereof using the corresponding wireless resource. Here, the transmission terminal has to indispensably transmit a channel sensing signal for informing that the transmission terminal is using the wireless resource, to other terminals performing the channel sensing. The channel sensing signal can have a sequence based signal structure similar to a random access preamble or a Reference Signal (RS).

In the distributed resource allocation method, there is a possibility of resource collision in which a plurality of transmission terminals performing the channel sensing determine that a particular wireless resource is empty and simultaneously transmit a signal thereof. In contrast, since a resource allocation terminal acting as a base station is not required, there is no burden for the complexity of the terminal. Furthermore, since the aforementioned resource allocation and the mediation information between the resource allocation terminals are not necessarily required in the central resource allocation method, the operation can be performed only with minimum signaling through a channel sensing signal. In particular, random back-off can be applied to alleviate the aforementioned resource collision between the transmission terminals. After the channel sensing is performed, when it is determined that a wireless resource is empty, the channel sensing continues to be performed for a back-off time randomly selected for each terminal. As a result, when the channel sensing signal transmitted by another terminal is not detected so that it is determined that the corresponding wireless resource is empty, the terminal starts transmission. In contrast, when it is determined that the corresponding wireless resource is not empty, the terminal stops the back-off.

A method of designing a D2DSS according to n embodiment of the present disclosure includes dividing a set of cyclic shift values that at least one sequence constituting a D2DSS can have into a plurality of subsets; making the divided subsets one-to-one correspond to the types of D2DSS transmission subjects; and generating, by a terminal transmitting the D2DSS, at least one sequence constituting the D2DSS by selecting at least one of the cyclic shift values pertaining to the subset corresponding to the type of transmission subject to which the terminal belongs.

A method of designing a D2DSS according to an embodiment of the present disclosure includes dividing a set of root index values that at least one Zadoff-Chu (LC) sequence constituting a D2DSS can have into a plurality of subsets; making the divided subsets correspond to the types of D2DSS transmission subjects one-to-one; and generating, by a terminal transmitting the D2DSS, at least one ZC sequence constituting the D2DSS by selecting at least one of the root index values pertaining to the subset corresponding to the type of transmission subject to which the terminal belongs.

A method of designing a D2DSS according to embodiment of the present disclosure includes differently configuring locations of physical layer resources to which one or more sequences constituting a D2DSS are mapped, according to the types of D2DSS transmission subjects; and generating and mapping, by a terminal transmitting the D2DSS, at least one sequence constituting the D2DSS at the location of the physical layer resource corresponding to the type of transmission subject to which the terminal belongs.

A method of designing a D2DSS according to an embodiment of the present disclosure includes differently determining relative locations of physical layer frequency resources to which at least two sequences constituting a D2DSS are mapped, according to the types of D2DSS transmission subjects; and generating and mapping, by a terminal transmitting the D2DSS, at least two sequences constituting the D2DSS at the relative location of the physical layer frequency resource corresponding to the type of transmission subject to which the terminal belongs.

A method of transmitting a D2DSS by a transmission terminal according to an embodiment of the present disclosure includes recognizing the type of a synchronization signal transmission subject by a synchronization signal detected by the transmission terminal; generating and mapping a D2DSS to a physical layer resource according to the type of the recognized synchronization signal transmission subject; and transmitting the D2DSS using a timing reference according to the detected synchronization signal.

A method of transmitting a D2DSS by a transmission terminal according to an embodiment of the present disclosure includes recognizing the types of synchronization signal transmission subjects from a plurality of synchronization signals detected by the transmission terminal; selecting the type of synchronization signal transmission subject transmitting the synchronization signal, the timing reference of which is to be used, among the types of recognized synchronization signal transmission subjects; generating and mapping the D2DSS to a physical layer resource according to the selected type of synchronization signal transmission subject; and transmitting the D2DSS using the timing reference according to the selected synchronization signal.

A method of designing a D2DSS according to an embodiment of the present disclosure includes dividing a set of cyclic shift values, which at least one sequence constituting a D2DSS can include, into a plurality of subsets; making each of the divided subsets correspond to the turn of a synchronization signal relay hop indicated by the corresponding D2DSS one-to-one; and generating, by a terminal transmitting the D2DSS, at least one sequence constituting the D2DSS by selecting at least one of the cyclic shift values pertaining to the subset corresponding to the D2DSS relay hop number thereof.

A method of designing a D2DSS according to an embodiment of the present disclosure includes dividing a set of root index values which at least one Zadoff-Chu (ZC) sequence constituting a D2DSS can include into a plurality of subsets; making each of the divided subsets correspond to the turn of a synchronization signal relay hop indicated by the corresponding D2DSS one-to-one; and generating, by a terminal transmitting the D2DSS, at least one ZC sequence constituting the D2DSS by selecting at least one of the root index values pertaining to the subset corresponding to the D2DSS relay hop number thereof.

A method of designing a D2DSS according to an embodiment of the present disclosure includes differently configuring locations of physical layer resources to which one or more sequences constituting a D2DSS are mapped according to the turn of a D2DSS relay hop to which the pertinent D2DSS corresponds; and generating and mapping, by a terminal transmitting the D2DSS, at least one sequence constituting the D2DSS to the location of the physical layer resource corresponding to the D2DSS relay hop number thereof.

Hereinafter, embodiments of the present disclosure will be described in more detail with reference to the accompanying drawings.

FIG. 1 illustrates an example of D2DSS signal design according to embodiments of the present disclosure. The embodiment D2DSS signal design shown in FIG. 1 is for illustrations only. Other embodiments could be used without departing from the scope of the present disclosure.

Referring to FIG. 1, in an embodiment of the present disclosure, a Device-to-Device Synchronization Signal (D2DSS) can be constituted by two sequences. In certain embodiments, the first sequence 100 includes a frequency length corresponding to subcarriers, except for subcarriers that are not used among frequency resources, configured with a length of K Resource Blocks (RBs) and a length of time corresponding to M symbols. In certain embodiments, the RB is a frequency resource allocation unit constituted by twelve subcarriers, and K can be determined as one positive integer. M of M symbols can be determined to have a value of at least '1,' and the symbol can be an Orthogonal Frequency Division Multiple Access (OFDMA) symbol or a Single Carrier Frequency Division Multiple Access (SC-FDMA) symbol. In addition, the first sequence 100 includes a structure in which two short sequences 101 and 102 alternate with each other in units of the subcarrier on a frequency axis.

The second sequence 103 starts at the symbol separated L symbols apart from the first sequence 100. In certain embodiments, L has a value of '0' or a positive integer. The second sequence 103 can be mapped to the same frequency range as the first sequence 100 over N symbol time period. In certain embodiments, the value of N is the same as the value of M.

In certain embodiments of the present disclosure, a D2DSS is transmitted at least two times within a radio frame having units of 10 ms. For example, the D2DSS can be transmitted in subframe 0 and subframe 5 of one radio frame. A terminal can attempt to detect the second sequence 103 first, when detecting the D2DSS. In certain embodiments, the second sequence 103 is employed for acquiring subframe unit synchronization using the same sequence at every D2DSS transmission time point within the radio frame. The second sequence 103 can have a Zadoff-Chu (ZC) sequence format. In addition, the ZC sequence can be generated according to one index value in a preconfigured set of root indices.

The terminal having acquired the subframe unit synchronization by detecting the second sequence 103 of the D2DSS successively attempts to detect the first sequence 100 located L symbols apart from the second sequence 103. In certain embodiments, the first sequence 100 is constituted by two short sequences 101 and 102, each of which can include an m-sequence based format. In addition, assuming that the D2DSS is transmitted in subframe 0 and subframe 5 per radio frame, subcarrier signals to which the first sequence 100 is mapped can include values given by Equation 1 below.

$$d(2n) = \begin{cases} s_0^{(m_0)}(n)c_0(n) & \text{in subframe 0} \\ s_1^{(m_1)}(n)c_0(n) & \text{in subframe 5} \end{cases}$$

$$d(2n+1) = \begin{cases} s_1^{(m_1)}(n)c_1(n)z_1^{(m_0)}(n) & \text{in subframe 0} \\ s_0^{(m_0)}(n)c_1(n)z_1^{(m_1)}(n) & \text{in subframe 5} \end{cases}$$

Equation 1 in Equation 1 above, d(*) denotes a subcarrier transmission signal to which the first sequence 100 is mapped, and n has a different range according to K and the number of unused subcarriers 104. For example, if K=6 and the number of unused subcarriers 104 is '10,' n can include a value ranging from '0' to (12*K−10)/2−1=30. Consequently, d(2n) denotes an even subcarrier to which the first sequence 100 is mapped, and d(2n+1) denotes an odd subcarrier to which the first sequence 100 is mapped.

In addition, $s_0^{(m0)}$ and $s_1^{(m1)}$ represent two short m-sequences $s_0$ and $s_1$ having a length of 31, and m0 and m1 denote cyclic shift values of m-sequence $s_0$ and $s_1$, respectively. $c_0$ and $c_1$ are m-sequence based scrambling sequences, and different cyclic shift values are determined according to the root index value of the second sequence. $z_1^{(m0)}$ and $z_1^{(m1)}$ are also m-sequence based scrambling sequences, and an odd subcarrier signal is multiplied by cyclic shift values $m_0$ and $m_1$. As shown in Equation 1, the first sequence signal can be used for acquiring radio frame unit synchronization, since the signals transmitted in subframe 0 and subframe 5 are different from each other.

In summary, the D2D terminal can acquire the subframe unit synchronization through the detection of the second sequence of the D2DSS and can acquire the radio frame unit synchronization through the detection of the first sequence. If a D2DSS signal is distinguishably designed according to the type of a D2DSS transmission subject based on the aforementioned structure (for example, the first sequence 100 and the second sequence 103 are differently configured according to the D2DSS transmission subject), the terminal to transmit the D2DSS can utilize the D2DSS to select the timing reference of the D2DSS transmission subject be used among a plurality of received D2DSSs.

In a different way, if a currently transmitted D2DSS signal is distinguishably designed according to the number of D2DSS relay hops for transmission thereof based on the aforementioned structure, the terminal to transmit the D2DSS can utilize the D2DSS to select the timing reference of the D2DSS to be used among a plurality of received D2DSSs. For example, a D2DSS can be transmitted using the timing reference based on the D2DSS having the smallest number of synchronization signal relay hops among the detected D2DSSs.

According to certain embodiments of the present disclosure, a D2DSS signal can be designed as follows. Since the range of cyclic shift values, which two short m-sequences constituting the first sequence 100 can have, is finite, available combinations of the cyclic shift values $m_0$ and $m_1$ are also determined as a finite set. Accordingly, a set constituted by the combinations of $m_0$ and $m_1$ is divided into at least two subsets, and each of the subsets corresponds to one of the types of D2DSS transmission subjects one-to-one. For example, it is assumed that $m_0$ and $m_1$ can include a value ranging from '0' to '30' and the types of D2DSS transmission subjects are defined as a terminal inside a cellular network service region and a terminal outside the cellular network service region. If there are 168 available combinations, namely, from combination 0 to combination 167, the combinations of $m_0$ and $m_1$ can be differentiated into two subsets as in Table 1 below.

TABLE 1

| combinations | m0 | m1 |
|---|---|---|
| 0 | 0 | 1 |
| 1 | 1 | 2 |
| 2 | 2 | 3 |
| 3 | 3 | 4 |
| 4 | 4 | 5 |
| 5 | 5 | 6 |
| 6 | 6 | 7 |
| 7 | 7 | 8 |
| 8 | 8 | 9 |
| 9 | 9 | 10 |
| 10 | 10 | 11 |
| 11 | 11 | 12 |
| 12 | 12 | 13 |
| 13 | 13 | 14 |
| 14 | 14 | 15 |
| 15 | 15 | 16 |
| 16 | 16 | 17 |
| 17 | 17 | 18 |
| 18 | 18 | 19 |
| 19 | 19 | 20 |
| 20 | 20 | 21 |
| 21 | 21 | 22 |
| 22 | 22 | 23 |
| 23 | 23 | 24 |
| 24 | 24 | 25 |
| 25 | 25 | 26 |
| 26 | 26 | 27 |
| 27 | 27 | 28 |
| 28 | 28 | 29 |
| 29 | 29 | 30 |
| 30 | 0 | 2 |
| 31 | 1 | 3 |
| 32 | 2 | 4 |
| 33 | 3 | 5 |
| 34 | 4 | 6 |
| 35 | 5 | 7 |
| 36 | 6 | 8 |
| 37 | 7 | 9 |
| 38 | 8 | 10 |
| 39 | 9 | 11 |
| 40 | 10 | 12 |
| 41 | 11 | 13 |
| 42 | 12 | 14 |
| 43 | 13 | 15 |
| 44 | 14 | 16 |
| 45 | 15 | 17 |
| 46 | 16 | 18 |
| 47 | 17 | 19 |
| 48 | 18 | 20 |
| 49 | 19 | 21 |
| 50 | 20 | 22 |
| 51 | 21 | 23 |
| 52 | 22 | 24 |
| 53 | 23 | 25 |
| 54 | 24 | 26 |
| 55 | 25 | 27 |
| 56 | 26 | 28 |
| 57 | 27 | 29 |
| 58 | 28 | 30 |
| 59 | 0 | 3 |
| 60 | 1 | 4 |
| 61 | 2 | 5 |
| 62 | 3 | 6 |
| 63 | 4 | 7 |
| 64 | 5 | 8 |
| 65 | 6 | 9 |
| 66 | 7 | 10 |
| 67 | 8 | 11 |

TABLE 1-continued

| combinations | m0 | m1 |
|---|---|---|
| 68 | 9 | 12 |
| 69 | 10 | 13 |
| 70 | 11 | 14 |
| 71 | 12 | 15 |
| 72 | 13 | 16 |
| 73 | 14 | 17 |
| 74 | 15 | 18 |
| 75 | 16 | 19 |
| 76 | 17 | 20 |
| 77 | 18 | 21 |
| 78 | 19 | 22 |
| 79 | 20 | 23 |
| 80 | 21 | 24 |
| 81 | 22 | 25 |
| 82 | 23 | 26 |
| 83 | 24 | 27 |
| 84 | 25 | 28 |
| 85 | 26 | 29 |
| 86 | 27 | 30 |
| 87 | 0 | 4 |
| 88 | 1 | 5 |
| 89 | 2 | 6 |
| 90 | 3 | 7 |
| 91 | 4 | 8 |
| 92 | 5 | 9 |
| 93 | 6 | 10 |
| 94 | 7 | 11 |
| 95 | 8 | 12 |
| 96 | 9 | 13 |
| 97 | 10 | 14 |
| 98 | 11 | 15 |
| 99 | 12 | 16 |
| 100 | 13 | 17 |
| 101 | 14 | 18 |
| 102 | 15 | 19 |
| 103 | 16 | 20 |
| 104 | 17 | 21 |
| 105 | 18 | 22 |
| 106 | 19 | 23 |
| 107 | 20 | 24 |
| 108 | 21 | 25 |
| 109 | 22 | 26 |
| 110 | 23 | 27 |
| 111 | 24 | 28 |
| 112 | 25 | 29 |
| 113 | 26 | 30 |
| 114 | 0 | 5 |
| 115 | 1 | 6 |
| 116 | 2 | 7 |
| 117 | 3 | 8 |
| 118 | 4 | 9 |
| 119 | 5 | 10 |
| 120 | 6 | 11 |
| 121 | 7 | 12 |
| 122 | 8 | 13 |
| 123 | 9 | 14 |
| 124 | 10 | 15 |
| 125 | 11 | 16 |
| 126 | 12 | 17 |
| 127 | 13 | 18 |
| 128 | 14 | 19 |
| 129 | 15 | 20 |
| 130 | 16 | 21 |
| 131 | 17 | 22 |
| 132 | 18 | 23 |
| 133 | 19 | 24 |
| 134 | 20 | 25 |
| 135 | 21 | 26 |
| 136 | 22 | 27 |
| 137 | 23 | 28 |
| 138 | 24 | 29 |
| 139 | 25 | 30 |
| 140 | 0 | 6 |
| 141 | 1 | 7 |
| 142 | 2 | 8 |
| 143 | 3 | 9 |
| 144 | 4 | 10 |
| 145 | 5 | 11 |
| 146 | 6 | 12 |
| 147 | 7 | 13 |
| 148 | 8 | 14 |
| 149 | 9 | 15 |
| 150 | 10 | 16 |
| 151 | 11 | 17 |
| 152 | 12 | 18 |
| 153 | 13 | 19 |
| 154 | 14 | 20 |
| 155 | 15 | 21 |
| 156 | 16 | 22 |
| 157 | 17 | 23 |
| 158 | 18 | 24 |
| 159 | 19 | 25 |
| 160 | 20 | 26 |
| 161 | 21 | 27 |
| 162 | 22 | 28 |
| 163 | 23 | 29 |
| 164 | 24 | 30 |
| 165 | 0 | 7 |
| 166 | 1 | 8 |
| 167 | 2 | 9 |
| — | — | — |
| — | — | — |

Table 1 illustrates combinations capable of being used when a Secondary Synchronization Signal (SSS) of a cellular network is generated. However, the embodiment of the present disclosure is for illustration only. Other embodiments are not limited to the combinations listed in Table 1, and new combinations can be defined and used.

A set of combinations from number 0 to number 84 in Table 1 denotes combinations of $m_0$ and $m_1$, which terminals inside the cellular network service region use to generate the first sequence 100 when transmitting a D2DSS. In addition, a set of combinations from number 85 to number 167 denotes combinations of $m_0$ and $m_1$ which terminals outside the cellular network service region use to generate the first sequence 100 when transmitting the D2DSS. The aforementioned method is not restricted to these embodiments, and the number of subsets or the number of available combinations can be variously changed.

Table 2 is a reference table for illustrating another example of D2D design. In a method of designing a D2DSS according to another embodiment of the present disclosure for achieving the objective, combinations, which are used to generate a Secondary Synchronization Signal (SSS) of the cellular network among the combinations of $m_0$ and $m_1$ in Table 1, are used to generate the first sequence 100 of a D2DSS transmitted by a terminal inside the cellular network service region. Separate combinations are additionally defined which are not used to generate the SSS of the cellular network, and the corresponding separate combinations can be used to generate the first sequence of a D2DSS transmitted by a terminal outside the cellular network service region. Table 2 below lists the combinations.

TABLE 2

| combinations | m0 | m1 |
|---|---|---|
| 0 | 0 | 1 |
| 1 | 1 | 2 |
| 2 | 2 | 3 |
| 3 | 3 | 4 |
| 4 | 4 | 5 |
| 5 | 5 | 6 |
| 6 | 6 | 7 |
| 7 | 7 | 8 |

TABLE 2-continued

| combinations | m0 | m1 |
|---|---|---|
| 8 | 8 | 9 |
| 9 | 9 | 10 |
| 10 | 10 | 11 |
| 11 | 11 | 12 |
| 12 | 12 | 13 |
| 13 | 13 | 14 |
| 14 | 14 | 15 |
| 15 | 15 | 16 |
| 16 | 16 | 17 |
| 17 | 17 | 18 |
| 18 | 18 | 19 |
| 19 | 19 | 20 |
| 20 | 20 | 21 |
| 21 | 21 | 22 |
| 22 | 22 | 23 |
| 23 | 23 | 24 |
| 24 | 24 | 25 |
| 25 | 25 | 26 |
| 26 | 26 | 27 |
| 27 | 27 | 28 |
| 28 | 28 | 29 |
| 29 | 29 | 30 |
| 30 | 0 | 2 |
| 31 | 1 | 3 |
| 32 | 2 | 4 |
| 33 | 3 | 5 |
| 34 | 4 | 6 |
| 35 | 5 | 7 |
| 36 | 6 | 8 |
| 37 | 7 | 9 |
| 38 | 8 | 10 |
| 39 | 9 | 11 |
| 40 | 10 | 12 |
| 41 | 11 | 13 |
| 42 | 12 | 14 |
| 43 | 13 | 15 |
| 44 | 14 | 16 |
| 45 | 15 | 17 |
| 46 | 16 | 18 |
| 47 | 17 | 19 |
| 48 | 18 | 20 |
| 49 | 19 | 21 |
| 50 | 20 | 22 |
| 51 | 21 | 23 |
| 52 | 22 | 24 |
| 53 | 23 | 25 |
| 54 | 24 | 26 |
| 55 | 25 | 27 |
| 56 | 26 | 28 |
| 57 | 27 | 29 |
| 58 | 28 | 30 |
| 59 | 0 | 3 |
| 60 | 1 | 4 |
| 61 | 2 | 5 |
| 62 | 3 | 6 |
| 63 | 4 | 7 |
| 64 | 5 | 8 |
| 65 | 6 | 9 |
| 66 | 7 | 10 |
| 67 | 8 | 11 |
| 68 | 9 | 12 |
| 69 | 10 | 13 |
| 70 | 11 | 14 |
| 71 | 12 | 15 |
| 72 | 13 | 16 |
| 73 | 14 | 17 |
| 74 | 15 | 18 |
| 75 | 16 | 19 |
| 76 | 17 | 20 |
| 77 | 18 | 21 |
| 78 | 19 | 22 |
| 79 | 20 | 23 |
| 80 | 21 | 24 |
| 81 | 22 | 25 |
| 82 | 23 | 26 |
| 83 | 24 | 27 |
| 84 | 25 | 28 |
| 85 | 26 | 29 |
| 86 | 27 | 30 |
| 87 | 0 | 4 |
| 88 | 1 | 5 |
| 89 | 2 | 6 |
| 90 | 3 | 7 |
| 91 | 4 | 8 |
| 92 | 5 | 9 |
| 93 | 6 | 10 |
| 94 | 7 | 11 |
| 95 | 8 | 12 |
| 96 | 9 | 13 |
| 97 | 10 | 14 |
| 98 | 11 | 15 |
| 99 | 12 | 16 |
| 100 | 13 | 17 |
| 101 | 14 | 18 |
| 102 | 15 | 19 |
| 103 | 16 | 20 |
| 104 | 17 | 21 |
| 105 | 18 | 22 |
| 106 | 19 | 23 |
| 107 | 20 | 24 |
| 108 | 21 | 25 |
| 109 | 22 | 26 |
| 110 | 23 | 27 |
| 111 | 24 | 28 |
| 112 | 25 | 29 |
| 113 | 26 | 30 |
| 114 | 0 | 5 |
| 115 | 1 | 6 |
| 116 | 2 | 7 |
| 117 | 3 | 8 |
| 118 | 4 | 9 |
| 119 | 5 | 10 |
| 120 | 6 | 11 |
| 121 | 7 | 12 |
| 122 | 8 | 13 |
| 123 | 9 | 14 |
| 124 | 10 | 15 |
| 125 | 11 | 16 |
| 126 | 12 | 17 |
| 127 | 13 | 18 |
| 128 | 14 | 19 |
| 129 | 15 | 20 |
| 130 | 16 | 21 |
| 131 | 17 | 22 |
| 132 | 18 | 23 |
| 133 | 19 | 24 |
| 134 | 20 | 25 |
| 135 | 21 | 26 |
| 136 | 22 | 27 |
| 137 | 23 | 28 |
| 138 | 24 | 29 |
| 139 | 25 | 30 |
| 140 | 0 | 6 |
| 141 | 1 | 7 |
| 142 | 2 | 8 |
| 143 | 3 | 9 |
| 144 | 4 | 10 |
| 145 | 5 | 11 |
| 146 | 6 | 12 |
| 147 | 7 | 13 |
| 148 | 8 | 14 |
| 149 | 9 | 15 |
| 150 | 10 | 16 |
| 151 | 11 | 17 |
| 152 | 12 | 18 |
| 153 | 13 | 19 |
| 154 | 14 | 20 |
| 155 | 15 | 21 |
| 156 | 16 | 22 |
| 157 | 17 | 23 |
| 158 | 18 | 24 |
| 159 | 19 | 25 |
| 160 | 20 | 26 |
| 161 | 21 | 27 |
| 162 | 22 | 28 |
| 163 | 23 | 29 |

TABLE 2-continued

| combinations | m0 | m1 |
|---|---|---|
| 164 | 24 | 30 |
| 165 | 0 | 7 |
| 166 | 1 | 8 |
| 167 | 2 | 9 |
| 168 | 3 | 10 |
| 169 | 4 | 11 |
| 170 | 5 | 12 |
| 171 | 6 | 13 |
| 172 | 7 | 14 |
| 173 | 8 | 15 |
| 174 | 9 | 16 |
| 175 | 10 | 17 |
| 176 | 11 | 18 |
| 177 | 12 | 19 |
| 178 | 13 | 20 |
| 179 | 14 | 21 |
| 180 | 15 | 22 |
| 181 | 16 | 23 |
| 182 | 17 | 24 |
| 183 | 18 | 25 |
| 184 | 19 | 26 |
| 185 | 20 | 27 |
| 186 | 21 | 28 |
| 187 | 22 | 29 |
| 188 | 23 | 30 |
| — | — | — |
| — | — | — |
| — | — | — |
| — | — | — |
| — | — | — |
| — | — | — |
| — | — | — |
| — | — | — |
| — | — | — |
| — | — | — |
| — | — | — |

A set of combinations marked with light shading, illustrated using oblique lines from the upper left to the lower right, denotes combinations used to generate an SSS transmitted by a base station. Terminals inside the cellular network service region are likely to conform to the timing reference of the base station to which the terminals belong, when transmitting a D2DSS. Accordingly, the combinations used to generate the SSS received from the base station can also be identically used to generate the first sequence of the D2DSS. Newly defined combinations from number 168 to number 188 in Table 2 can be designed such that the terminals outside the cellular network service region use the combinations when generating the first sequence 100 of the D2DSS. If the types of D2DSS transmission subjects are finely divided, the two subsets shown in Table 2 can also be divided into lower level subsets one-to-one corresponding to the finely divided types. The aforementioned methods are not restricted to these embodiments, and the number of newly defined subsets or the number of available combinations can be variously changed.

In certain embodiments, the D2DSS signal according to the embodiment can be designed to inform of the number of D2DSS relay hops through which the D2DSS is transmitted or relayed. For example, the number of the D2DSS relay hop indicates the number of relaying of the D2DSS after generation of the D2DSS. For example, the set constituted by the combinations of $m_0$ and $m_1$ are divided into subsets corresponding to the number of D2DSS relay hops (for example, 0, 1, or 2), and the respective subsets correspond to the number of D2DSS relay hops corresponding to the D2DSS one-to-one. For example, the combinations from number 0 to number 167 in Table 2 are used to transmit a D2DSS, with a timing reference established based on Primary Synchronization Signal (PSS)/Secondary Synchronizations Signal (SSS) received from a base station. Since the corresponding terminal transmits the D2DSS first using the timing reference from the PSS or SSS, there is no previously relay hopped D2DSS. That is, the corresponding terminal generates the D2DSS to transmit, based on the relay hop number 0. In certain embodiments, a terminal that detects no synchronization signal and therefore transmits a D2DSS, can also generate the corresponding D2DSS based on the D2DSS relay hop number 0. The combinations from number 168 to number 177 are used to generate a D2DSS having the synchronization signal relay hop number of 1. The combinations from number 178 to number 188 are used to generate a D2DSS having the synchronization signal relay hop number of 2.

In applying the methods of indicating the synchronization signal relay hop number using the D2DSS according to the aforementioned embodiments, the D2DSS can be subjected to Time Division Multiplexing (TDM) according to the synchronization signal relay hop number. If TDM methods are not applied, D2DSSs indicating different synchronization signal relay hop numbers can coexist at the same time point or in the subframe. In the case where the TDM methods are not applied, a terminal transmitting the D2DSS can fail to simultaneously receive a D2DSS having different synchronization signal relay hop number from another terminal.

For example, assume that the maximum value of the synchronization signal relay hop number is defined as 2 and the terminals apply the TDM method when supporting the synchronization signal relay hop. The terminal receiving D2DSSs of hop number 1 in time resources for the D2DSS of synchronization signal relay hop number 1 can smoothly perform the synchronization signal relay hop by transmitting a D2DSS of hop number 2 in different time resources for a D2DSS of synchronization signal relay hop number 2.

When a D2DSS is subjected to TDM methods for each synchronization signal relay hop, at least one of the following methods can be applied.

In a first method, a mapping rule can be previously defined to map a D2DSS of the smallest synchronization signal relay hop number to time resources precedent to D2DSSs of different synchronization signal relay hop number and then sequentially allocate the D2DSSs to the time resources in order in which the synchronization signal relay hop number increases. In certain embodiments, the largest synchronization signal relay hop number are previously defined in a system or configured by a central control subject. The terminal recognizes the synchronization signal relay hop number corresponding to the relevant D2DSS through the received D2DSS. The terminal determines D2DSS time resources of different synchronization signal relay hop numbers based on the recognized synchronization signal relay hop number and the received D2DSS time resources. When the terminal performs the synchronization signal relay hop based on the received D2DSS, the terminal generates a D2DSS of the synchronization signal relay hop number corresponding to this and transmits the D2DSS using the time resources of the corresponding hop number.

If the received D2DSS indicates the largest synchronization signal relay hop number, the terminal cannot perform the synchronization signal relay hop any longer. In addition, the terminal generates a D2DSS of the smallest synchronization signal relay hop number and performs a new synchronization signal relay hop by transmitting the D2DSS using time resources corresponding to the new synchronization signal.

In a second method, a mapping rule is previously defined to map a D2DSS of the largest synchronization signal relay hop number to time resources precedent to D2DSSs of different synchronization signal relay hop number and then sequentially to allocate the D2DSSs to the time resources in order in which the synchronization signal relay hop number decreases.

The terminal recognizes the synchronization signal relay hop number corresponding to the relevant D2DSS through the received D2DSS. The terminal determines D2DSS time resources of different synchronization signal relay hop number based on the recognized synchronization signal relay hop number and the received D2DSS time resources. When the terminal performs the synchronization signal relay hop based on the received D2DSS, the terminal generates a D2DSS of the synchronization signal relay hop number corresponding to received D2DSS and transmits the D2DSS using time resources of the corresponding hop number.

If the received D2DSS indicates the smallest synchronization signal relay hop number, the terminal cannot perform the synchronization signal relay hop any longer or performs a new synchronization signal relay hop by generating a D2DSS of the largest synchronization signal relay hop number and transmitting the D2DSS using time resources corresponding to the received D2DSS.

In the aforementioned mapping rules, a time resource interval between D2DSSs of different synchronization signal relay hop numbers can be continuous or dispersible.

A method of designing a Device-to-Device Synchronization Signal (D2DSS) according to an embodiment of the present disclosure is to divide a set of root index values which at least one sequence constituting the D2DSS, for example the second sequence 103, can have into a plurality of subsets. The divided subsets correspond to the types of D2DSS transmission subjects one-to-one. For example, a set of root indices, which a current LTE base station can use when generating a Primary Synchronization Signal (PSS), is constituted by 25, 29, and 34. In generating the second sequence 103 of the D2DSS, a separate set can be defined and used which is constituted by a root index, which the cellular network base station can use, and at least one other root index value.

For example, the second sequence 103 of the D2DSS transmitted by a terminal outside the cellular network service region can be generated using the root index pertaining to the separate set. The second sequence of the D2DSS transmitted by a terminal inside the cellular network service region can be generated using the root index value which the base station has used when transmitting a PSS. Alternatively, a separate set can be defined that is constituted by other root index values other than the root indices, which are used by the aforementioned base stations 25, 29, and 34, and can be divided into subsets corresponding to the types of D2DSS transmission subjects one-to-one.

The D2DSS signal according to certain embodiments is designed in a different way to inform of the number of D2DSS relay hops for transmission thereof. For example, the set of root indices or the respective root index values are divided into subsets corresponding to the D2DSS relay hop number, and each of the subsets corresponds to the D2DSS relay hop number corresponding to the D2DSS one-to-one. For example, root indices 25, 29, and 34 correspond to the D2DSS relay hop number 0, 1, and 2, respectively.

In methods of designing a D2DSS according to certain embodiments of the present disclosure, locations of physical layer resources to which at least one sequence constituting the D2DSS, for example the first sequence 100, is mapped can be differently defined according to the type of D2DSS transmission subject. For example, two short m-sequences constituting the first sequence 100 of the D2DSS can be defined as shown in Equation 1. The first sequence 100 generated and mapped according to Equation 1 can be used when the terminal inside the cellular network service region generates the D2DSS.

In contrast, when the terminal outside the cellular network service region generates the D2DSS, the first sequence 100 can be generated and mapped according to Equation 2 defined below.

$$d(2n+1) = \begin{cases} s_0^{(m_0)}(n)c_0(n) & \text{in subframe } 0 \\ s_1^{(m_1)}(n)c_0(n) & \text{in subframe } 5 \end{cases}$$

$$d(2n) = \begin{cases} s_1^{(m_1)}(n)c_1(n)z_1^{(m_0)}(n) & \text{in subframe } 0 \\ s_0^{(m_0)}(n)c_1(n)z_1^{(m_1)}(n) & \text{in subframe } 5 \end{cases}$$

Equation 2

The definitions of variables in Equation 2 are the same as those in Equation 1. Equations 1 and 2 are different from each other in that the signals transmitted to even and odd subcarriers are switched to each other at a time point of transmitting two D2DSSs within a radio frame. That is, the case in which the first sequence 100 is generated and mapped according to the Equation 1 when the D2DSS is generated and the case in which the first sequence 100 is generated and mapped according to Equation 2 can correspond to generation and snapping of the D2DSS first sequence 100 of the terminal inside the cellular network service region and the D2DSS first sequence 100 of the terminal outside the cellular network service region. The aforementioned methods are not limited to these embodiments, and the definition can be made with the corresponding relation changed.

In methods of designing a D2DSS according to certain embodiments of the present disclosure, it is possible to differently define locations of relative frequency resources to which at least two sequences constitute the D2DSS, such as the first sequence 100 and the second sequence 103 are mapped according to the type of D2DSS transmission subject. For example, in the D2DSS of the terminal inside the cellular network service region, the first sequence 100 and the second sequence 103 are transmitted to locations that are the same in frequency but different in time. Meanwhile, in the D2DSS of the terminal outside the cellular network service region, the first sequence 100 and the second sequence 103 are transmitted to locations that are different in time and frequency. In certain embodiments, a difference in relative frequency location between the two sequences is the predetermined number of subcarriers or an RB value.

The D2DSS signal according to the embodiment can be designed in a different way to inform the number of D2DSS relay hops for transmission thereof. For example, if the D2DSS is mapped through the plural methods as described above, each of the mapping methods can correspond to the D2DSS relay hop number corresponding to the D2DSS one-to-one.

The root index and the combination indices of $m_0$ and $m_1$ used to distinguish the type of D2DSS transmission subject when the first sequence 100 or the second sequence 103 is generated in the aforementioned D2DSS design methods are used for various applications, such as an input of an initialization function in generating a scrambling sequence used in D2D physical channel transmission or reception, an input of a Demodulation Reference Signal (DMRS) generation function of a D2D physical channel, and an input of a time or frequency hop location definition function of a D2D physical channel and signal. In addition, the root index and the combination indices of $m_0$ and $m_1$ can be used to inform an ID of the corresponding D2DSS transmission subject independently or in combination of two indices.

Based on the aforementioned D2DSS design methods, a terminal can receive a D2DSS from another terminal or generate and transmit a D2DSS to another terminal. A method of using a D2DSS designed using the methods will be described below in more detail.

Figure 2:
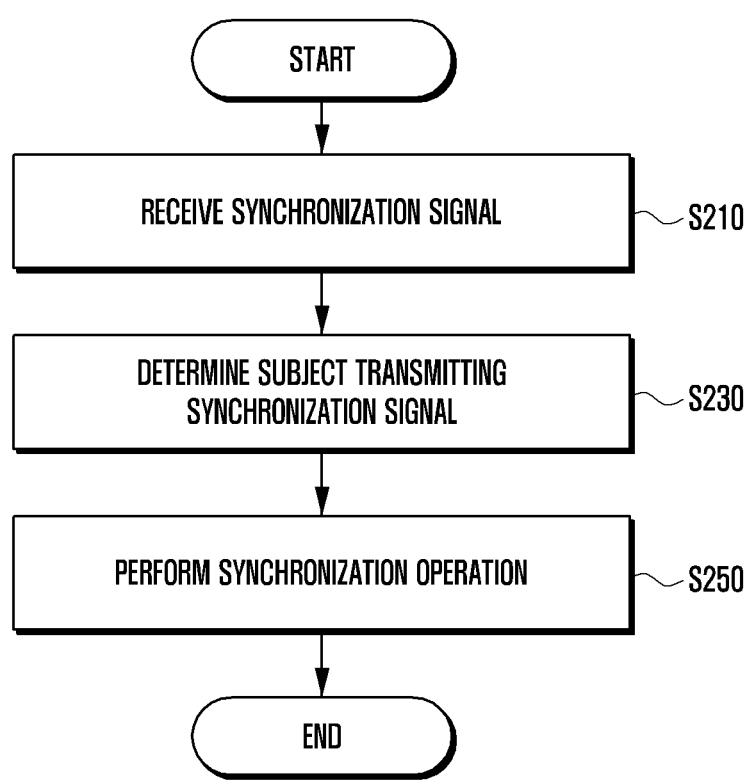
FIG. 2 illustrates an exemplary process for detecting a synchronization signal according to embodiments of the present disclosure.

FIG. 2 illustrates an exemplary process for detecting a synchronization signal according to embodiments of the present disclosure. Referring to FIG. 2, a terminal receives a synchronization signal in step 200. The synchronization signal can be a PSS or SSS transmitted by a base station, a synchronization signal transmitted by another terminal inside a service region, or a synchronization signal transmitted by another terminal outside the service region. A plurality of types of synchronization signals is received. In this case, the terminal performs a synchronization operation according to a preconfigured priority order as will be described below.

In step 205, the terminal determines a subject having transmitted the synchronization signal, based on the received synchronization signal. Since the PSS or SSS transmitted by a base station is distinguished from D2DSSs transmitted by other terminals, the terminal can detect the PSS or SSS. In addition, since a synchronization signal transmitted by a terminal inside the service area and a synchronization signal transmitted by a terminal outside the service area are designed to be distinguished from each other according to the aforementioned D2DSS design method, the terminal distinguishes the synchronization signals. The terminal distinguishes the type of synchronization signal and when a plurality of synchronization signals are received and determines the synchronization signal serving as a timing reference, depending upon the priorities thereof. In certain embodiments, when selecting the timing reference of the subject having transmitted the synchronization signal, the terminal makes a configuration such that a PSS or SSS transmitted by a base station has the highest priority, a D2DSS transmitted by a terminal inside a cellular network service region has the intermediate priority, and a D2DSS transmitted by a terminal outside the cellular network service region has the lowest priority. This embodiment is merely exemplary, and the present disclosure is not limited thereto.

In step 210, the terminal performs a synchronization operation, based on the received synchronization signal. In certain embodiments, the synchronization operation is an operation of identically or correspondingly adjusting the synchronization of the terminal based on the timing reference, determined by the terminal, among the received synchronization signals. In addition, the synchronization operation can include an operation of transmitting a new D2DSS based on the determined timing reference.

Next, various embodiments of detecting and using a synchronization signal will be described with reference to FIGS. 3-8. Hereinafter, a step for detecting a PSS or SSS transmitted by a base station, a step for detecting a D2DSS transmitted by a terminal inside a network service region, and a step for detecting a D2DSS transmitted by a terminal outside the network service region are separately illustrated in FIGS. 3-8 in a similar way.

However, the embodiments of the present disclosure are not limited to differentiating the synchronization signal detection steps. That is, as illustrated in FIGS. 3-8, synchronization signals can also be detected in separate steps, respectively. In addition, a determination can also be made as to ether a synchronization signal of a signal received through one procedure corresponds to a synchronization signal transmitted by a base station, a synchronization signal transmitted by a terminal inside a service region, or a synchronization signal transmitted by a terminal outside the service region. Furthermore, a procedure of detecting a synchronization signal of a base station and a procedure of detecting a synchronization signal transmitted by another terminal can be separately configured, and in the procedure of detecting a synchronization signal, a determination can also be made as to whether the synchronization signal transmitted by the another terminal is a signal transmitted by a terminal inside a service region or a signal transmitted by a terminal outside the service region.

Figure 3:
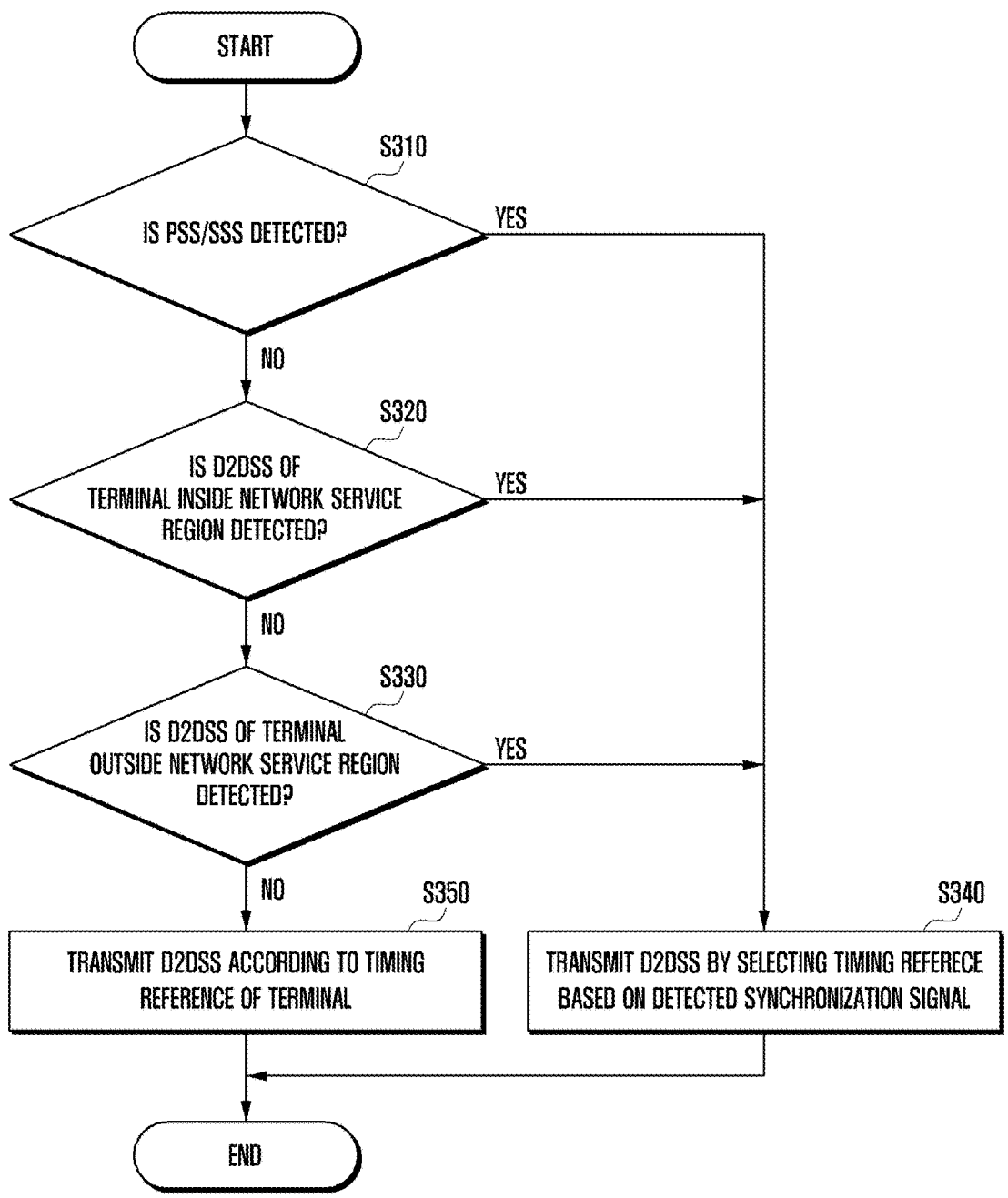
FIG. 3 illustrates an exemplary process for detecting and transmitting D2DSS according to embodiments of the present disclosure.

FIG. 3 illustrates an exemplary process for detecting and transmitting a D2DSS according to embodiments of the present disclosure. Referring to FIG. 3, a terminal receives a signal transmitted by a base station or another terminal and detects a synchronization signal.

In step 300, the terminal attempts to detect PSS or SSS, which is transmitted from a base station, from a signal received thorough a downlink. The detection can be performed for a preset period of time. If a PSS or SSS is not detected for the preset period of time or the preset number of detection attempts, the corresponding terminal recognizes that a base station capable of providing a cellular network service is not present, and proceeds to step 305.

In step 305, the corresponding terminal attempts to detect a D2DSS transmitted by a terminal inside a cellular network service region. The detection can be performed for a preset period of time. In certain embodiments, the corresponding terminal attempts to detect a D2DSS using one of the D2DSS design methods, described as embodiments of the present disclosure, transmitted by a terminal inside the aforementioned cellular network service region. If no D2DSS is detected for the preset period of time or the number of detection attempts, the terminal recognizes that there is no adjacent cellular network service region, and proceeds to step 310.

In step 310, the corresponding terminal attempts to detect a D2DSS transmitted by a terminal outside the cellular network service region. In certain embodiments, the corresponding terminal attempts to detect a D2DSS using one of the D2DSS design methods (the D2DSS design methods mentioned as the embodiments of the present disclosure prior to the description of FIG. 2) transmitted by a terminal outside the aforementioned cellular network service region. If no D2DSS is detected during a preset period of time or the number of detection attempts, the corresponding terminal recognizes that a subject capable of providing synchronization is not present.

When the terminal receives no synchronization signal transmitted from a base station or any other terminal in the step 310, the terminal proceeds to step 315 to transmit a D2DSS according to the timing reference thereof. In certain embodiments, the terminal transmitting the D2DSS transmits a D2DSS designed on the basis of the aforementioned D2DSS design method of distinguishing subjects of transmission. For example, the reason the terminal fails to receive a PSS or SSS from a base station in step 300 can be because the terminal is located outside the service region of the base station. Therefore, the terminal generates a D2DSS transmitted by a terminal outside the service region and transmits the generated D2DSS.

In certain embodiments of the present disclosure, where the terminal succeeds in detecting a synchronization signal in at least one of steps 300, 305, and 310, the corresponding terminal proceeds to step 320 to transmit a D2DSS using the timing reference obtained from the detected synchronization signal. For example, when the terminal detects a PSS or SSS from a base station in step 300, the terminal generates a D2DSS based on the PSS or SSS detected from the base station and transmits the generated D2DSS to other terminals, in step 315. When the terminal detects a D2DSS from a terminal inside the service region of the base station in step 305, the terminal transmits the D2DSS signal generated based on the detected D2DSS to other terminals. In addition, when the terminal detects a D2DSS from a terminal outside the service region of the base station in step 310, the terminal transmits the D2DSS signal generated based on the detected D2DSS to other terminals.

In certain embodiments of the present disclosure, where a plurality of synchronization signals are detected, the terminal recognizes the subject having transmitted each of the synchronization signals, when detecting the corresponding synchronization signal through the aforementioned DSDSS design methods, and selects the timing reference of the synchronization signal by which the D2DSS is to be transmitted, based on the recognized subject.

When the timing reference of the subject transmitting the synchronization signal is selected, the base station has the highest priority, a D2DSS transmitted by a terminal inside a cellular network service region has the next highest priority, and a D2DSS transmitted by a terminal outside the cellular network service has the lowest priority. The reason for prioritizing the synchronization signal is to alleviate, as soon as possible, interference between a cellular uplink signal and a D2D signal, which is caused by different timing references, by inducing D2D terminals to share the timing reference used inside the cellular network service region that is the main service target when an LTE system supporting the cellular service additionally supports D2D communication. However, this embodiment is merely an exemplary embodiment, and the selection of the timing reference is not necessarily limited thereto. For example, the strength of the detected synchronization signal can also be further considered.

Figure 4:
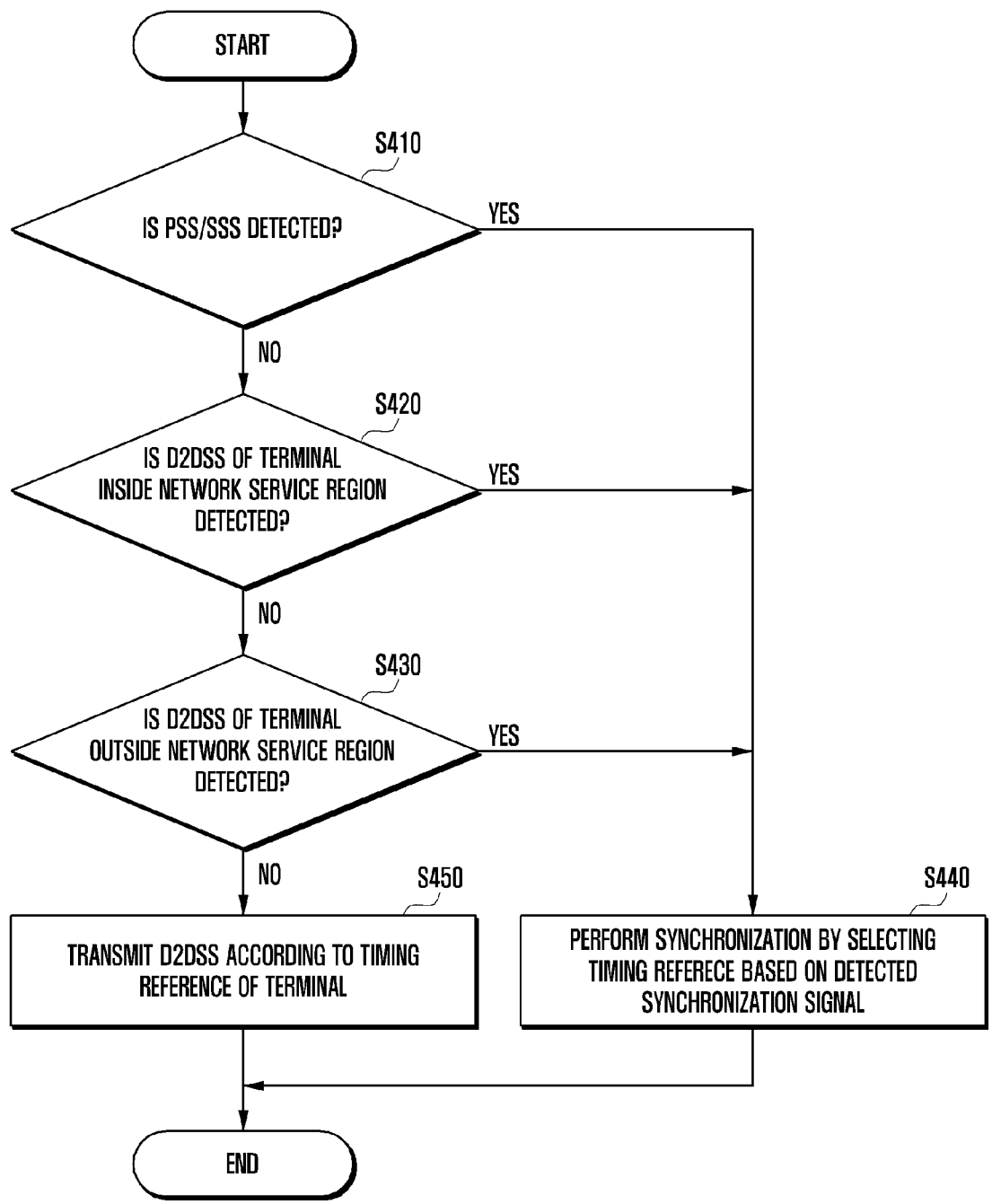
FIG. 4 illustrates an exemplary process for detecting a synchronization signal and performing synchronization configuration according to embodiments of the present disclosure.

FIG. 4 illustrates an exemplary process for detecting a synchronization signal and performing synchronization configuration according to an embodiment of the present disclosure. Referring to FIG. 4, the steps 400, 405, and 410 are similar to the steps 300, 305, and 310 illustrated in FIG. 3, respectively.

In step 400, a terminal attempts to detect a PSS or SSS from a base station received through a downlink. If a PSS or SSS is not detected for a preset period of time or the preset number of detection attempts, the corresponding terminal recognizes that a base station capable of providing a cellular network service is not present and proceeds to step 405.

In step 405, the corresponding terminal attempts to detect a D2DSS transmitted by a terminal inside a cellular network service region. In certain embodiments, the corresponding terminal attempts to detect the D2DSS using one D2DSS design method transmitted by the aforementioned terminal inside the cellular network service. If no D2DSS is detected during a preset period of time or the number of detection attempts, the terminal recognizes that there is no adjacent cellular network service region and proceeds to step 410 to attempt to detect a D2DSS transmitted by a terminal outside the cellular network service region. In certain embodiments, the corresponding terminal attempts to detect the D2DSS using one D2DSS design method transmitted by the aforementioned terminal outside the cellular network service. If no D2DSS is detected during a preset period of time or the number of detection attempts, the corresponding terminal recognizes that a subject capable of providing synchronization is not present and proceeds to step 415.

The terminal fails to receive or detect a synchronization signal for configuring a timing reference for synchronization in steps 400, 405, and 410 and generates a synchronization signal based on the timing reference thereof and transmit the generated synchronization signal to other terminals there around in step 415. In certain embodiments, the reason why the terminal fails to detect PSS or SSS from the downlink signal transmitted from the base station in step 400 can be determined that the terminal is located outside the service region of the base station. Therefore, the terminal transmits the generated D2DSS to other terminals, based on the D2DSS design method transmitted by a terminal outside the service region.

In cases where the terminal succeeds in detecting a synchronization signal in at least one of steps 400, 405, and 410, the corresponding terminal can proceed to step 420 to fit the synchronization using the timing reference obtained from the detected synchronization signal. In certain embodiments, in cases where a plurality of synchronization signals are detected, the terminal recognizes the subject having transmitted each of the synchronization signals when detecting the corresponding synchronization signal through the aforementioned DSDSS design methods and selects the timing reference of the synchronization signal by which the synchronization is to be performed based on the recognized subject. As in step 420, the terminal cannot act as a relay and can also use the received synchronization signal only for fitting the synchronization thereof.

Figure 5:
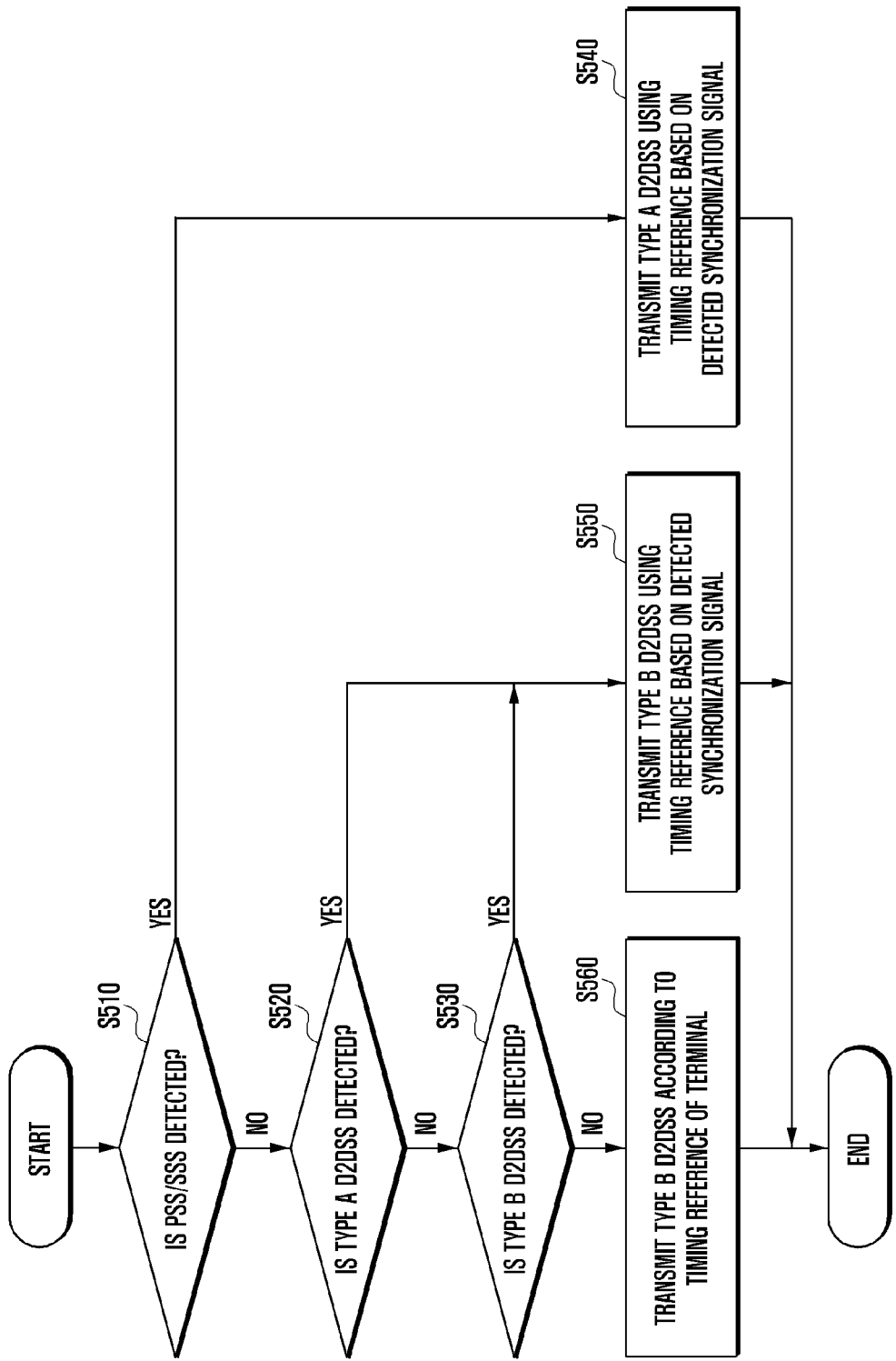
FIG. 5 illustrates an exemplary process for detecting and transmitting a synchronization signal according to embodiments of the present disclosure.

FIG. 5 illustrates an exemplary process for detecting and transmitting a synchronization signal according to embodiments of the present disclosure.

In step 500, a terminal attempts to detect a PSS or SSS from a base station received through a downlink. If a PSS or SSS is not detected for a preset period of time or the preset number of detection attempts, the corresponding terminal recognizes that a base station capable of providing a cellular network service is not present and proceeds to step 505.

In step 505, the corresponding terminal attempts to detect a D2DSS (Type A D2DSS) transmitted by a terminal inside a cellular network service region. In certain embodiments, the corresponding terminal attempts to detect the D2DSS using one of the aforementioned D2DSS design methods. If a Type A D2DSS is not detected during a preset period of time or the number of detection attempts, the terminal recognizes that there is no adjacent cellular network service region and proceeds to step 510.

In step 510, the corresponding terminal attempts to detect a D2DSS (Type B D2DSS) transmitted by a terminal outside the cellular network service region. In certain embodiments, the corresponding terminal attempts to detect the D2DSS using one of the aforementioned D2DSS design methods. If a Type B D2DSS is not detected during a preset period of time or the number of detection attempts, the corresponding terminal recognizes that a subject capable of providing synchronization is not present and proceeds to step 515.

In step 515, the corresponding terminal transmits the D2DSS according to the timing reference thereof. In certain embodiments, the D2DSS transmitted by the corresponding terminal can be a Type B D2DSS, because the corresponding terminal transmits the D2DSS outside the network service region. Since the terminal fails to detect a PSS or SSS from the downlink transmitted from the base station in step 500, a determination is made that the terminal is present outside the service region.

When succeeding in detecting the synchronization signal in step 500, the corresponding terminal proceeds to step 520 to fit the synchronization using the timing reference obtained from the detected synchronization signal. In certain embodiments, the D2DSS transmitted by the corresponding terminal is a Type A D2DSS, because the corresponding terminal transmits the D2DSS inside the network service region. Since the terminal detects a PSS or SSS from the downlink transmitted from the base station, it is determined that the terminal is present inside the service region of the base station.

In cases where the terminal succeeds in detecting a synchronization signal in at least one of steps 505 and 510, the corresponding terminal proceeds to step 525 to transmit the D2DSS using the timing reference obtained from the detected synchronization signal. In certain embodiments, the D2DSS transmitted by the corresponding terminal is a Type B D2DSS, because the corresponding terminal transmits the D2DSS outside the network service region.

Figure 6:
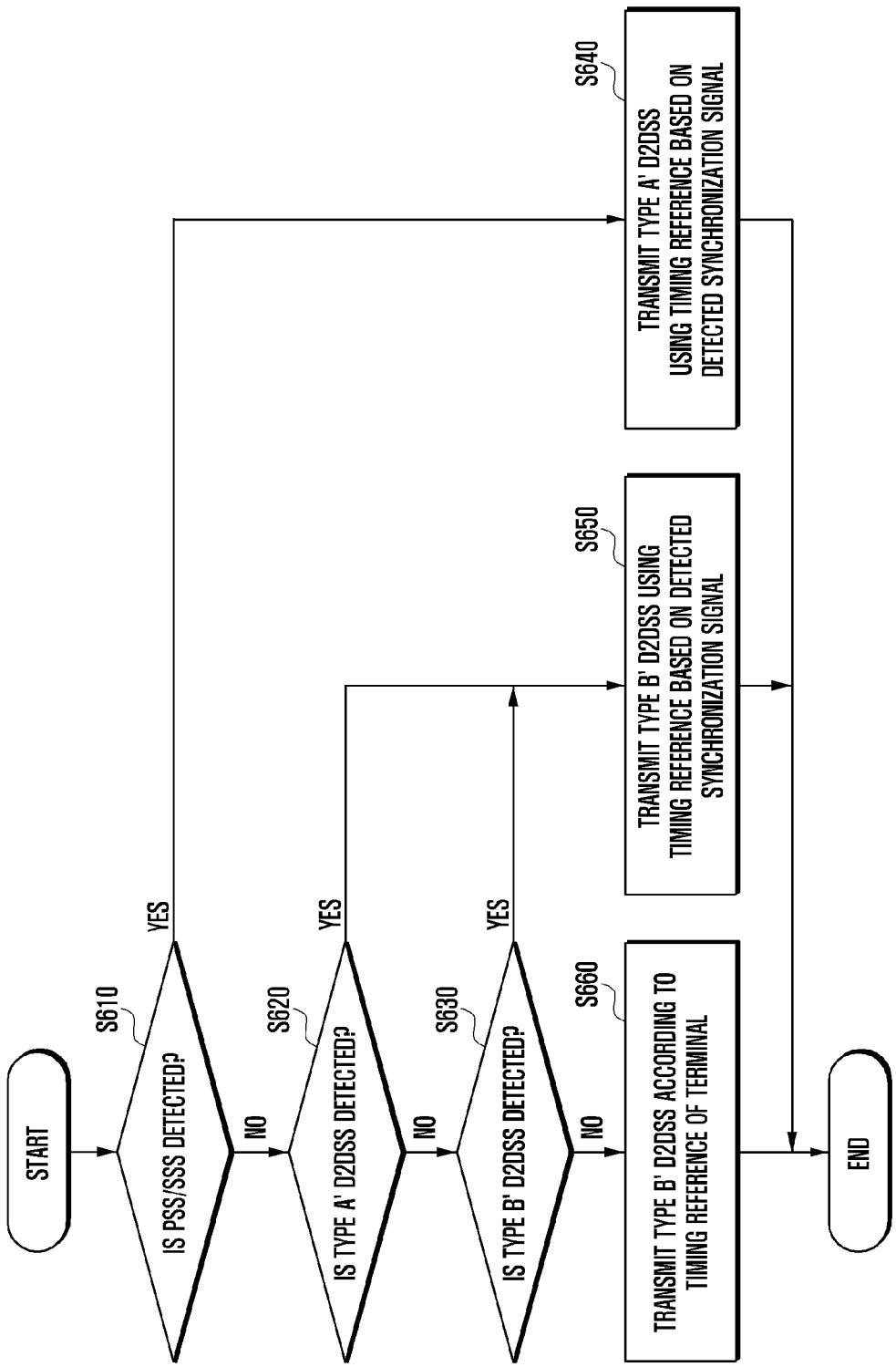
FIG. 6 illustrates an exemplary process for detecting and transmitting a synchronization signal according to embodiments of the present disclosure.

FIG. 6 illustrates an exemplary process for detecting and transmitting a synchronization signal according to embodiments of the present disclosure.

In step 600, a terminal attempts to detect a PSS or SSS from a base station received through a downlink. If a PSS or SSS is not detected for a preset period of time or the preset number of detection attempts, the corresponding terminal recognizes that a base station capable of providing a cellular network service is not present and proceeds to step 605.

In step 605, the corresponding terminal attempts to detect a Type A' D2DSS transmitted by a terminal according to the synchronization reference inside a cellular network service region. In certain embodiments, the corresponding terminal attempts to detect the D2DSS using one of the aforementioned D2DSS design methods. If no Type A' D2DSS is detected during a preset period of time or the number of detection attempts, the terminal recognizes that there is no adjacent cellular network service region and proceeds to step 610.

In step 610, the corresponding terminal attempts to detect a Type B' D2DSS transmitted by a terminal which does not conform the synchronization reference inside the cellular network service region. In certain embodiments, the corresponding terminal attempts to detect the D2DSS using one of the aforementioned D2DSS design methods. If no Type B' D2DSS is detected during a preset period of time or the number of detection attempts, the corresponding terminal recognizes that a subject capable of providing synchronization is not present and proceeds to step 615.

In step 615, the corresponding terminal transmits the D2DSS according to the timing reference thereof. In certain embodiments, the D2DSS transmitted by the corresponding terminal is a Type B' D2DSS, because the corresponding terminal transmits the D2DSS while not conforming to the timing reference inside the network service region.

In the case where the terminal succeeds in detecting a synchronization signal in at least one of steps 600 and 605, the corresponding terminal proceeds to step 620 to fit the synchronization using the timing reference obtained from the detected synchronization signal. In certain embodiments, the D2DSS transmitted by the corresponding terminal is a Type A' D2DSS, because the corresponding terminal transmits the D2DSS while conforming to the timing reference inside the network service region.

When succeeding in detecting the synchronization signal in step 610, the corresponding terminal proceeds to step 625 to transmit the D2DSS using the timing reference obtained from the detected synchronization signal. In certain embodiments, the D2DSS transmitted by the corresponding terminal is a Type B' D2DSS, because the corresponding terminal transmits the D2DSS while not conforming to the timing reference inside the network service region.

Figure 7:
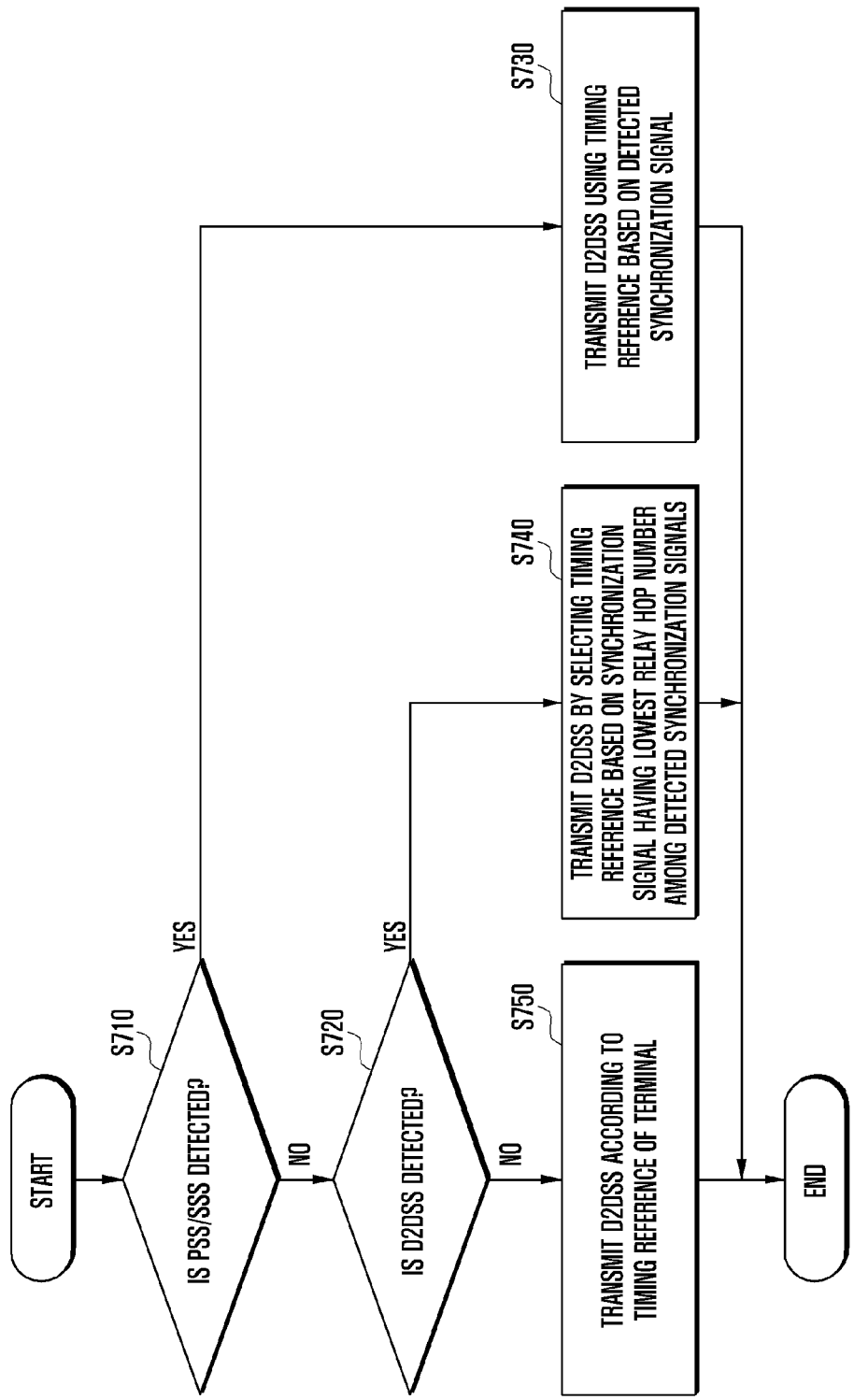
FIG. 7 illustrates an exemplary process for detecting a synchronization signal and transmitting the synchronization signal based on a hop number according to embodiments of the present disclosure.

FIG. 7 illustrates an exemplary process for detecting a synchronization signal and transmitting the synchronization signal based on a hop number according to embodiments of the present disclosure.

In step 700, a terminal attempts to detect a PSS or SSS from a base station received through a downlink. If a PSS or SSS is not detected for a preset period of time or the preset number of detection attempts, the corresponding terminal recognizes that a base station capable of providing a cellular network service is not present and proceeds to step 705.

In step 705, the corresponding terminal attempts to detect a D2DSS transmitted by another terminal. In certain embodiments, the corresponding terminal attempts to detect the D2DSS using one of the aforementioned D2DSS design methods. If no D2DSS is detected during a preset period of time or the number of detection attempts, the corresponding terminal recognizes that a subject capable of providing synchronization is not present and proceeds to step 710 to transmit the D2DSS according to the timing reference thereof.

When succeeding in detecting the synchronization signal in step 700, the corresponding terminal proceeds to step 715 to fit the synchronization using the timing reference obtained from the detected synchronization signal and transmit the D2DSS. In this certain embodiments, the D2DSS transmitted by the corresponding terminal is generated to correspond to the lowest synchronization signal relay hop number, for example a synchronization signal relay hop number 1.

When succeeding in detecting the synchronization signal in step 705, the corresponding terminal proceeds to step 720 to transmit the D2DSS using the timing reference based on the D2DSS having the lowest synchronization signal relay hop number among the detected D2DSSs. In this case, the D2DSS transmitted by the corresponding terminal can be generated to correspond to a synchronization signal relay hop number a value of 1 greater than the synchronization signal relay hop number represented by the D2DSS which the corresponding terminal detects and currently uses as the timing reference for the transmission of the D2DSS.

Figure 8:
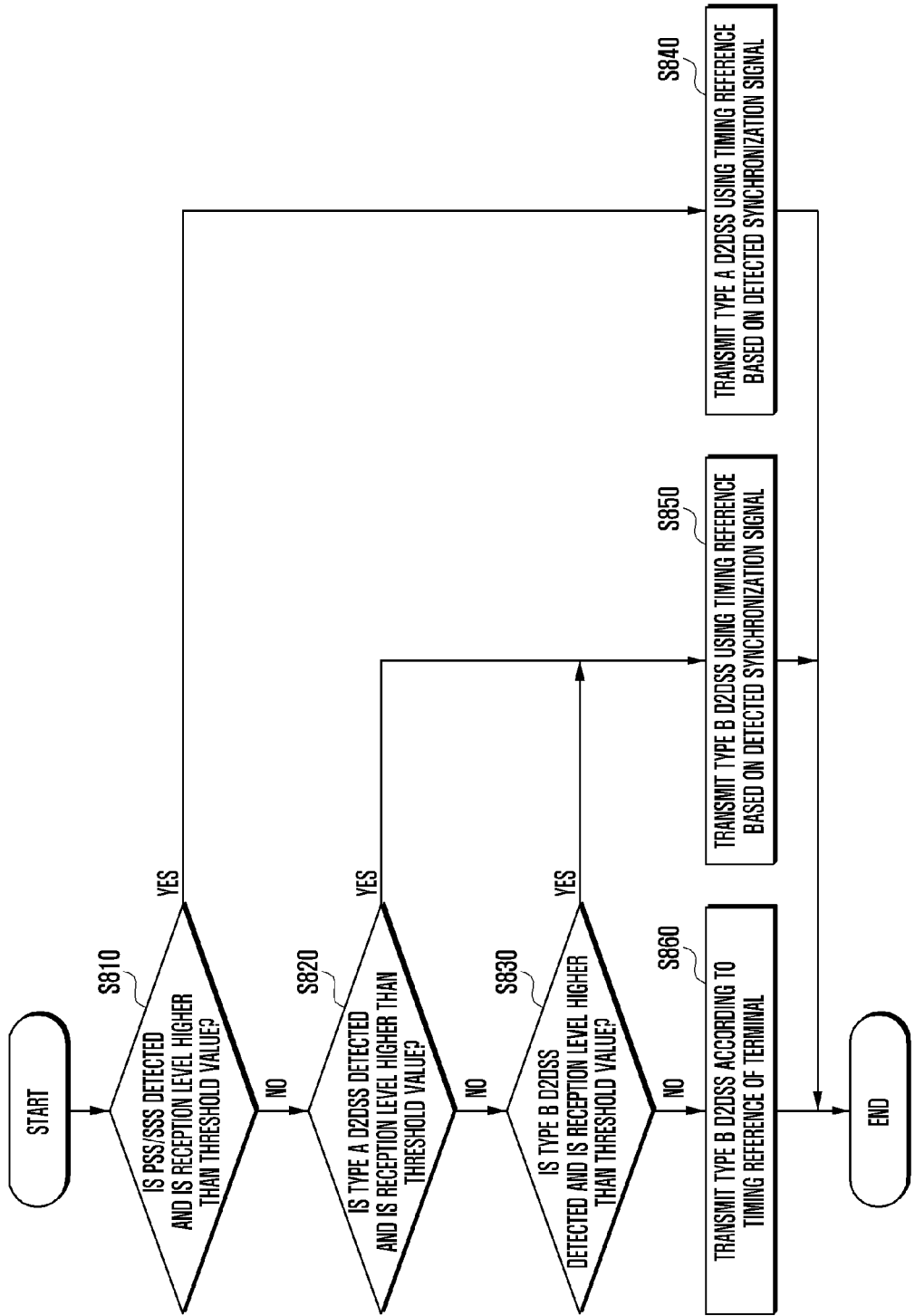
FIG. 8 illustrates an exemplary process for detecting a synchronization signal and transmitting the synchronization signal based on a reception level according to embodiments of the present disclosure.

FIG. 8 illustrates an exemplary process for detecting a synchronization signal and transmitting the synchronization signal based on a reception level according to embodiments of the present disclosure.

In step 800, a terminal attempts to detect a PSS/SSS from a base station received through a downlink. If a PSS or SSS is not detected for a preset period of time or the preset number of detection attempts or the reception level of the detected signal is lower than a preconfigured threshold value, the corresponding terminal recognizes that a base station capable of providing a cellular network service is not present and proceeds to step 805.

In step 805, the corresponding terminal attempts to detect a Type A D2DSS transmitted by a terminal inside a cellular network service region. In certain embodiments, the corresponding terminal attempts to detect the D2DSS using one of the aforementioned D2DSS design methods. If no Type A D2DSS is detected during a preset period of time or the number of detection attempts or the reception level of the detected signal is lower than a preconfigured threshold value, the terminal recognizes that there is no adjacent cellular network service region and proceeds to step 810.

In step 810, the corresponding terminal attempts to detect a Type B D2DSS transmitted by a terminal outside the cellular network service region. In certain embodiments, the corresponding terminal attempts to detect the D2DSS using one of the aforementioned D2DSS design methods. If no Type B D2DSS is detected during a preset period of time or the number of detection attempts or the reception level of the detected signal is lower than a preconfigured threshold value, the corresponding terminal recognizes that a subject capable of providing synchronization is not present and proceeds to step 815.

In step 815, the terminal transmits the D2DSS according to the timing reference thereof. In certain embodiments, the D2DSS transmitted by the corresponding terminal is a Type B D2DSS, because the corresponding terminal transmits the D2DSS outside the network service region.

When the terminal succeeds in detecting the synchronization signal and the reception level of the detected signal is higher than or equal to the preconfigured threshold value in step 800, the corresponding terminal proceeds to step 820 to fit the synchronization using the timing reference obtained from the detected synchronization signal. In certain embodiments, the D2DSS transmitted by the corresponding terminal is a Type A D2DSS, because the corresponding terminal transmits the D2DSS inside the network service region.

When the terminal succeeds in detecting the synchronization signal and the reception level of the detected signal is higher than or equal to the preconfigured threshold value in at least one of steps 805 and 810, the corresponding terminal proceeds to step 825 to transmit the D2DSS according to the timing reference obtained from the detected synchronization signal. In certain embodiments, the D2DSS transmitted by the corresponding terminal is a Type B D2DSS, because the corresponding terminal transmits the D2DSS outside the network service region. The process of adding, as a timing reference determination condition, the determination as to whether the reception level of the detected synchronization signal is higher than or equal to the preconfigured threshold value can be applied to all the embodiments illustrated in FIGS. 3-7.

The D2DSS design method described above with reference to FIG. 1 can be applied to all the embodiments illustrated in FIGS. 2-8. In addition, it is apparent to those skilled in the art that the contents of each of the embodiments described in FIGS. 2-8 can be applied to the different embodiments.

Figure 9:
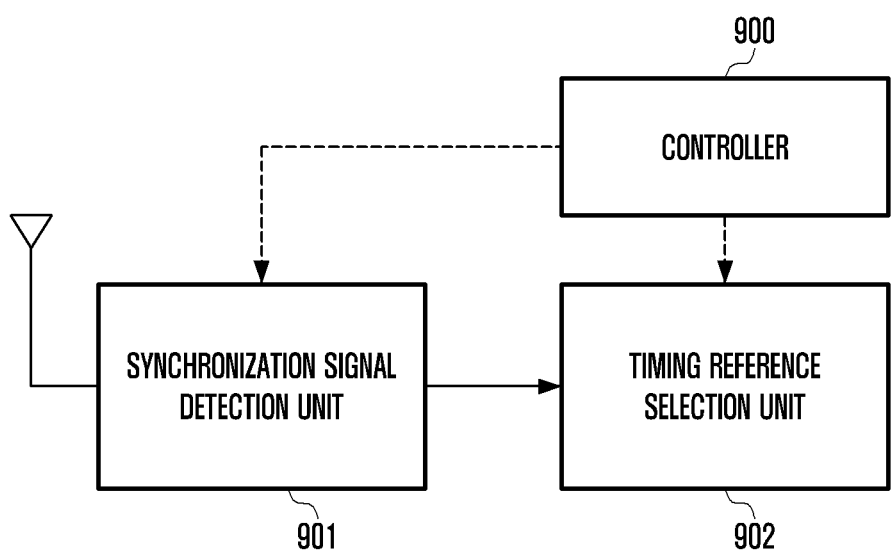
FIG. 9 illustrates a block diagram of a reception block of a D2DSS transmission terminal according to embodiments of the present disclosure.

FIG. 9 illustrates a block diagram of a reception block of a D2DSS transmission terminal according to embodiments of the present disclosure. The embodiment of the block diagram shown in FIG. 9 is for illustration only. Other embodiments could be used without departing from the scope of the present disclosure.

The reception block includes a controller 900, a synchronization signal detection unit 901, and a timing reference selection unit 902.

The controller 900 controls the transmission terminal to perform the operations in one of the aforementioned embodiments and configures control information on a PSS or SSS, a D2DSS of a terminal inside a network service region, a D2DSS of a terminal outside the network service region, and on the selection of the timing reference. The synchronization signal detection unit 901 detects the PSS or SSS, the D2DSS of the terminal inside the network service region, and the D2DSS of the terminal outside the network service region according to the control information configured by the controller 900.

The timing reference selection unit 902 performs a function of determining the timing reference to be used when a terminal transmits a D2DSS, from the synchronization signal detected by the synchronization signal detection unit 901. In certain embodiments, the timing reference selection unit 902 complies with the timing reference selection method configured by the controller 900.

Figure 10:
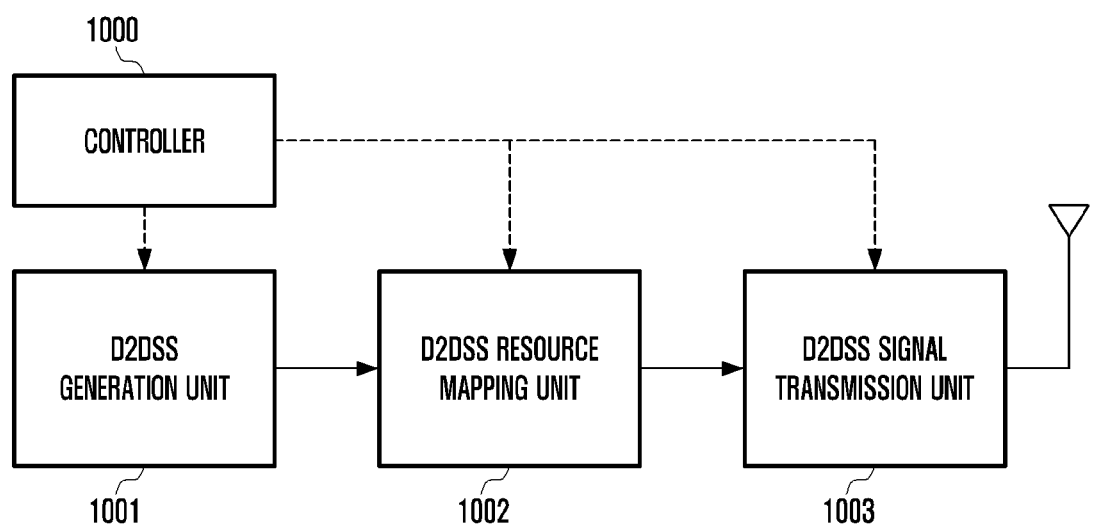
FIG. 10 illustrates a block diagram of a transmission block of a D21?SS transmission terminal according to embodiments of the present disclosure.

FIG. 10 illustrates a block diagram of a transmission block of a D2DSS transmission terminal according to embodiments of the present disclosure. The embodiment of the transmission block shown in FIG. 10 is for illustration only. Other embodiments could be used without departing from the scope of the present disclosure.

The transmission block includes a controller 1000, a D2DSS generation unit 1001, a D2DSS resource mapping unit 1002, and a D2DSS signal transmission unit 1003.

The controller 1000 controls the transmission terminal to perform the operations in any of the aforementioned embodiments. The D2DSS generation unit 1001 generates an appropriate D2DSS depending upon the control information, which the controller 1000 has configured in consideration of the type of synchronization signal transmission subject of the corresponding terminal. The D2DSS resource mapping unit 1002 maps, to a physical layer resource, the D2DSS generated depending upon the control information, which the controller 1000 has configured in consideration of the type of synchronization signal transmission subject of the corresponding terminal. The D2DSS signal transmission unit 1003 transmits the D2DSS according to the control information configured by the controller 1000 on the basis of the timing reference obtained by receiving another synchronization signal before the transmission of the D2DSS.

The reception block and the transmission block have been described above with reference to FIGS. 9 and 10, respectively. However, this is to separately describe the transmission operation and the reception operation of the terminal, and the transmission and reception blocks do not necessarily operate separately.

For example, a terminal can also be expressed with a transmission or reception unit for transmitting or receiving a signal to or from at least one base station or terminal and a controller for controlling the overall operation thereof. In certain embodiments, it is apparent that the controller can control the operation of each component in the reception block and the operation of each component in the transmission block.

According to embodiments of the present disclosure, the controller determines a service attribute for identifying whether the terminal is serviced by at least one base station, and controls the terminal to generate a D2DSS capable of identifying whether the terminal is serviced by the base station, based on the determination result. In certain embodiments, the service attribute is information for indicating whether the terminal is serviced by the base station, whether the terminal receives a signal from another terminal within the service range of the base station, and whether the terminal receives a signal from another terminal beyond the service range of the base station.

In certain embodiments, the controller configures a set of cyclic shift values, which at least one sequence constituting the D2DSS can have, as at least two subsets, makes a configuration such that the at least two subsets correspond to the service attributes of the terminal, and makes a control to generate at least one sequence constituting the D2DSS, based on elements contained in the subsets corresponding to the service attributes of the terminal.

In certain embodiments, the controller configures a set of root index values, which at least one Zadoff-Chu (ZC) sequence constituting the D2DSS can have, as at least two subsets, makes a configuration such that the at least two subsets correspond to the service attributes of the terminal, and makes a control to generate at least one ZC sequence constituting the D2DSS, based on elements contained in the subsets corresponding to the service attributes of the terminal.

In certain embodiments, the controller differently configures the locations of physical layer resources, to which one or more sequences constituting the D2DSS are mapped, according to the service attributes, and makes a control to map the one or more sequences constituting the D2DSS to the locations of the physical layer resources corresponding to the service attributes of the terminal.

In certain embodiments, the controller differently configures the relative locations of physical layer resources, to which at least two sequences constituting the D2DSS are mapped, according to the service attributes, and makes a control to map the at least two sequences constituting the D2DSS to the relative locations of the physical layer resources corresponding to the service attributes of the terminal.

In certain embodiments, the controller receives a D2DSS from at least one other terminal, determines the order of a synchronization signal relay hop corresponding to the received D2DSS, and makes a control to generate a new D2DSS based on the service attributes and the information on the synchronization signal relay hop of the received D2DSS.

In certain embodiments, the controller receives a signal from the at least one base station or another device, determines whether a synchronization signal is detected from the received signal, and makes a control to configure synchronization with another device based on the timing reference of the detected synchronization signal when the synchronization signal is detected.

In certain embodiments, the controller makes a control to generate a Device-to-Device Synchronization Signal (D2DSS) based on the timing reference of the detected synchronization signal when the synchronization signal is detected. The controller makes a control to generate a new D2DSS according to the timing reference of the terminal, when the synchronization signal is not detected.

In certain embodiments, the controller determines whether the synchronization signal transmitted by a base station is detected. When the synchronization signal transmitted by the base station is not detected, the controller determines whether the synchronization signal transmitted by another device is detected. In addition, the controller determines whether the D2DSS transmitted by a device inside a network service region is detected. When the D2DSS transmitted by the device inside the network service region is not detected, the controller determines whether the D2DSS transmitted by a device outside the network service region is detected.

In certain embodiments, the controller takes a control to generate a D2DSS corresponding to the type of synchronization signal of a terminal inside a service region when the detected synchronization signal is a synchronization signal received from a base station, and makes a control to generate a D2DSS corresponding to the type of synchronization signal of a terminal outside the service region when the detected synchronization signal is a synchronization signal received from another device.

In certain embodiments, the controller makes a control to allocate the received D2DSS to a time resource based on the hop information when generating the new D2DSS. In certain embodiments, the controller applies the aforementioned Time Division Multiplexing (TDM) method.

In certain embodiments, the controller makes a control to generate a D2DSS corresponding to the type of synchronization signal of a terminal inside a service region when the detected synchronization signal is a synchronization signal received from a base station or a synchronization signal received from a device inside the service region, and makes a control to generate a D2DSS corresponding to the type of synchronization signal of a terminal outside the service region when the detected synchronization signal is a synchronization signal received from a device outside the service region.

In certain embodiments, the controller makes a control to generate a new D2DSS according to the timing reference of the terminal corresponding to the type of synchronization signal of a terminal outside the service region. The controller determines the number of D2D relays through which the detected synchronization signal has been received and makes a control to generate a D2DSS based on the timing reference of the synchronization signal received through the smallest number of D2D relays. The controller determines whether the reception signal strength for the detected synchronization signal is greater than or equal to a preconfigured threshold value, and makes a control to generate a D2DSS according to the timing reference of the synchronization signal detected from signals having a reception signal strength of the preconfigured threshold value or greater.

The operations of the controller of the terminal according to the embodiment of the present disclosure have been described above. However, these are only for convenience of description, and the present disclosure is not necessarily limited thereto. In addition, the controller can control the operations of the terminal proposed in the synchronization configuration method, the synchronization signal design method, the synchronization detection method, and the synchronization signal transmission method according to the present disclosure, which have been described with reference to FIGS. 1-8.

Although the embodiments to which the 3GPP LTE uplink based transmission method is applied have been described above, the present disclosure is not limited thereto and may also be applied to other transmission methods.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method by a terminal in a wireless communication system, the method comprising:
 generating a synchronization signal for device to device (D2D) communication; and
 transmitting the synchronization signal to at least one device,
 wherein the synchronization signal is generated based on a first root index if the terminal is in a coverage of a base station, and wherein the synchronization signal is generated based on a second root index if the terminal is out of the coverage of the base station.

2. The method of claim 1, wherein the first root index and the second root index are different from a root index used by the base station.

3. The method of claim 1, wherein a sequence for the synchronization signal is generated based on one of the first root index and the second root index.

4. The method of claim 1, wherein the synchronization signal is generated based on information received from the base station if the terminal is in the coverage of the base station.

5. The method of claim 1, wherein the synchronization signal is generated based on the second root index if the terminal is out of the coverage of the base station and another terminal is not detected for synchronization reference.

6. A terminal in a wireless communication system, the terminal comprising:

a transceiver configured to transmit and receive a signal; and a controller configured to:

generate a synchronization signal for device to device (D2D) communication, and transmit the synchronization signal to at least one device, wherein the synchronization signal is generated based on a first root index if the terminal is in a coverage of a base station, and wherein the synchronization signal is generated based on a second root index if the terminal is out of the coverage of the base station.

7. The terminal of claim 6, wherein the first root index and the second root index are different from a root index used by the base station.

8. The terminal of claim 6, wherein a sequence for the synchronization signal is generated based on one of the first root index and the second root index.

9. The terminal of claim 6, wherein the synchronization signal is generated based on information received from the base station if the terminal is in the coverage of the base station.

10. The terminal of claim 6, wherein the synchronization signal is generated based on the second root index if the terminal is out of the coverage of the base station and another terminal is not detected for synchronization reference.

* * * * *